United States Patent
Takemoto

(10) Patent No.: US 10,761,302 B2
(45) Date of Patent: Sep. 1, 2020

(54) ZOOM LENS AND IMAGE PICKUP APPARATUS

(71) Applicant: CANON KABUSHIKI KAISHA, Tokyo (JP)

(72) Inventor: Shoichi Takemoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 15/949,542

(22) Filed: Apr. 10, 2018

(65) Prior Publication Data
US 2018/0292627 A1    Oct. 11, 2018

(30) Foreign Application Priority Data
Apr. 11, 2017  (JP) .................. 2017-077997

(51) Int. Cl.
| | |
|---|---|
| G02B 13/00 | (2006.01) |
| G02B 15/20 | (2006.01) |
| G02B 15/173 | (2006.01) |
| G03B 5/02 | (2006.01) |
| G03B 13/34 | (2006.01) |

(52) U.S. Cl.
CPC ....... *G02B 13/009* (2013.01); *G02B 13/0045* (2013.01); *G02B 15/173* (2013.01); *G02B 15/20* (2013.01); *G03B 5/02* (2013.01); *G03B 13/34* (2013.01); *G03B 2205/0015* (2013.01); *G03B 2205/0046* (2013.01)

(58) Field of Classification Search
CPC ........ G02B 13/18; G02B 13/04; G02B 13/24; G02B 13/009; G02B 13/0045; G02B 9/60; G02B 9/34; G02B 15/173; G02B 15/20; G02B 15/22; G02B 15/163; G02B 15/14; G02B 15/177; G02B 27/64; G02B 27/646; G03B 5/02; G03B 13/34; G03B 2205/0015; G03B 2205/0046

USPC ....... 359/684, 657–660, 686, 693, 695, 713, 359/714, 750–757, 557, 763, 764, 772, 359/773, 766

See application file for complete search history.

(56) References Cited

U.S. PATENT DOCUMENTS

| | | |
|---|---|---|
| 9,645,369 B2 | 5/2017 | Takemoto |
| 9,709,781 B2 | 7/2017 | Takemoto |
| 9,739,986 B2 | 8/2017 | Wakazono et al. |

(Continued)

FOREIGN PATENT DOCUMENTS

| | | |
|---|---|---|
| JP | 2013-015743 A | 1/2013 |
| JP | 2016-102887 A | 6/2016 |

*Primary Examiner* — Jie Lei
(74) *Attorney, Agent, or Firm* — Carter, DeLuca & Farrell LLP

(57) ABSTRACT

Provided is a zoom lens including in order from an object side: a positive first unit configured not to move for zooming; a negative second unit configured to move for zooming; a positive third unit configured to move for zooming; a negative fourth unit configured to move for zooming; and a positive rear unit including at least one lens unit, wherein the fourth unit is configured to move for focusing, and wherein a focal length of the fourth unit, a focal length of the rear unit at a telephoto end, a focal length of the zoom lens at a wide angle end, amounts of movement of the second and third units from the wide angle end to the telephoto end, a half angle of view at the wide angle end, an amount of displacement of an in-focus position.

10 Claims, 11 Drawing Sheets

(56) References Cited

U.S. PATENT DOCUMENTS

| | | |
|---|---|---|
| 9,904,044 B2 | 2/2018 | Kikuchi et al. |
| 2013/0010174 A1* | 1/2013 | Shinohara .............. G02B 13/18 |
| | | 348/335 |
| 2014/0118605 A1* | 5/2014 | Kawamura .......... G02B 15/173 |
| | | 348/345 |
| 2017/0269374 A1 | 9/2017 | Takemoto et al. |
| 2018/0045928 A1 | 2/2018 | Takemoto |
| 2018/0045929 A1 | 2/2018 | Takemoto |

\* cited by examiner

ZOOM LENS AND IMAGE PICKUP APPARATUS

BACKGROUND OF THE INVENTION

Field of the Invention

The present invention relates to a zoom lens and an image pickup apparatus.

Description of the Related Art

In recent years, downsizing of the overall sizes of apparatus using solid-state image pickup elements, such as digital still cameras and video cameras, has been advanced. As image pickup optical systems used in such apparatus, there is a demand for bright zoom lenses having a high zoom ratio and high optical performance over the entire zoom range, for example. Meanwhile, large-size solid-state image pickup elements are demanded in order to obtain images having high image quality and a shallow depth of field, whereas further downsizing of zoom lenses is demanded.

There has hitherto been known a five-unit zoom lens including, in order from an object side to an image side, a first lens unit to a fifth lens unit having positive, negative, positive, negative, and positive refractive powers.

For example, in Japanese Patent Application Laid-Open No. 2013-015743, there is disclosed a lens including, in order from an object side, lens units having positive, negative, positive, negative, and positive refractive powers, in which the second lens unit, the third lens unit, and the fifth lens unit are configured to move during zooming. In Japanese Patent Application Laid-Open No. 2016-102887, there is disclosed a configuration including, in order from an object side, lens units having positive, negative, positive, negative, and positive refractive powers, in which the second lens unit, the third lens unit, and the fourth lens unit are configured to move during zooming.

In the case of supporting the increase in size of the solid-state image pickup element described above, the size of a lens itself is increased in order to increase the image size of the lens, and hence downsizing of the lens is a problem to be solved. Further, the lens with a larger image size also has a longer focal length even at the same angle of view. This leads to an increase in extension amount of the focusing lens unit during focusing, which increases in proportion to the square of the focal length, and hence the downsizing becomes more difficult.

In the five-unit zoom lens, in order to obtain high optical performance in the overall zooming range while achieving downsizing of the entire system and an increase in zoom ratio, it is important to appropriately set a refractive power of each lens unit, moving conditions accompanied by zooming of each lens unit, and other conditions. For example, in order to reduce the extension amount of the focusing lens unit, it is important to appropriately set the relationship of the focal length between the focusing lens unit and a lens unit arranged closer to the image side than the focusing lens unit. Further, in order to achieve a high zooming ratio while achieving the downsizing, it is important to appropriately set the relationship of the amount of movement between the second lens unit and the third lens unit during zooming. Without appropriate settings of those values, it becomes highly difficult to obtain high optical performance in the overall zooming range while achieving downsizing of the entire system and a high zooming ratio.

In a zoom lens described in Japanese Patent Application Laid-Open No. 2013-015743, the fifth lens unit is set as the focusing lens unit, and it is thus difficult to reduce the extension amount of the focusing lens unit. In a zoom lens described in Japanese Patent Application Laid-Open No. 2016-102887, the fourth lens unit is set as the focusing lens unit, but the ratio of the refractive power between the fourth lens unit and the fifth lens unit does not have such a relationship as to reduce the extension amount of the focusing lens unit.

SUMMARY OF THE INVENTION

The present invention provides, for example, a zoom lens advantageous in a large image size, a small size, a high zooming ratio, and a high optical performance over an entire zoom range thereof.

There is provided a zoom lens including in order from an object side to an image side: a first lens unit having a positive refractive power and configured not to move for zooming; a second lens unit having a negative refractive power and configured to move for zooming; a third lens unit having a positive refractive power and configured to move for zooming; a fourth lens unit having a negative refractive power and configured to move for zooming; and a rear lens unit having a positive refractive power and including at least one lens unit, wherein the fourth lens unit is configured to move for focusing, and wherein conditional expressions:

$-0.60 < f4/fR < -0.20;$ $-5.00 < M2/M3 < -1.50;$ and $-0.42 < dskt/(fw \times \tan \omega w) < -0.15,$ are satisfied, where f4 represents a focal length of the fourth lens unit, fR represents a focal length of the rear lens unit at a telephoto end, fw represents a focal length of the zoom lens at a wide angle end, M2 represents an amount of movement of the second lens unit from the wide angle end to the telephoto end, M3 represents an amount of movement of the third lens unit from the wide angle end to the telephoto end, ωw represents a half angle of view at the wide angle end, "dskt" (mm) represents an amount of displacement of a focus position in a case where the fourth lens unit moves toward the image side by 1 (mm) in a state in which the focus position is at infinity at the telephoto end, and a sign of an amount of movement of a lens unit is negative in a case where the lens unit moves toward the object side, and the sign is positive in a case where the lens unit moves toward the image side with respect to zooming from the wide angle end to the telephoto end.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings. A zoom lens according to one embodiment of the present invention includes, in order from an object side to an image side, a first lens unit having a positive refractive power, a second lens unit having a negative refractive power, a third lens unit having a positive refractive power, a fourth lens unit having a negative refractive power, and a rear lens group. During zooming, at least the second lens unit, the third lens unit, and the fourth lens unit move.

Figure 1:
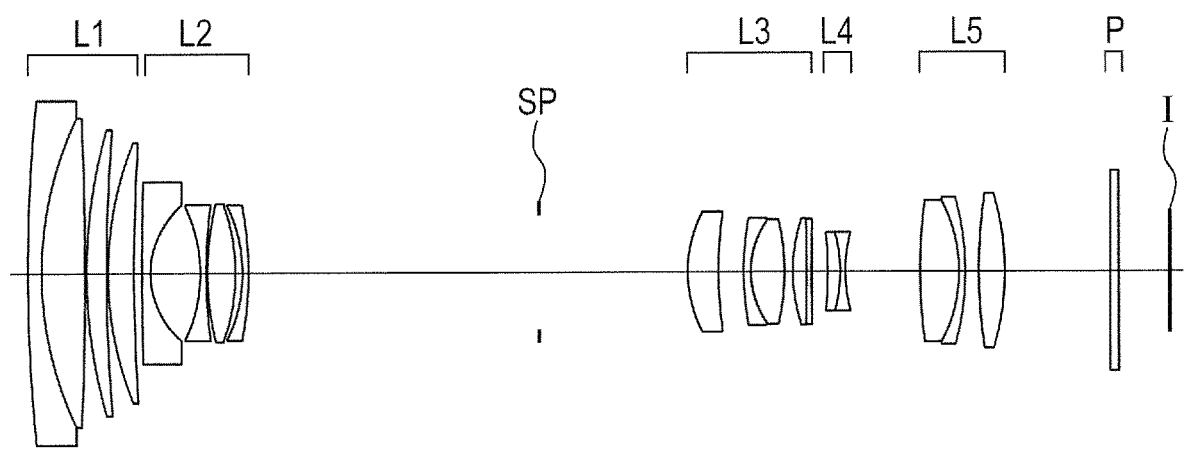
FIG. 1 is a lens cross-sectional view in a state in which focus is at infinity at a wide angle end in Embodiment 1 (Numerical Embodiment 1) of the present invention.
Figure 2A:
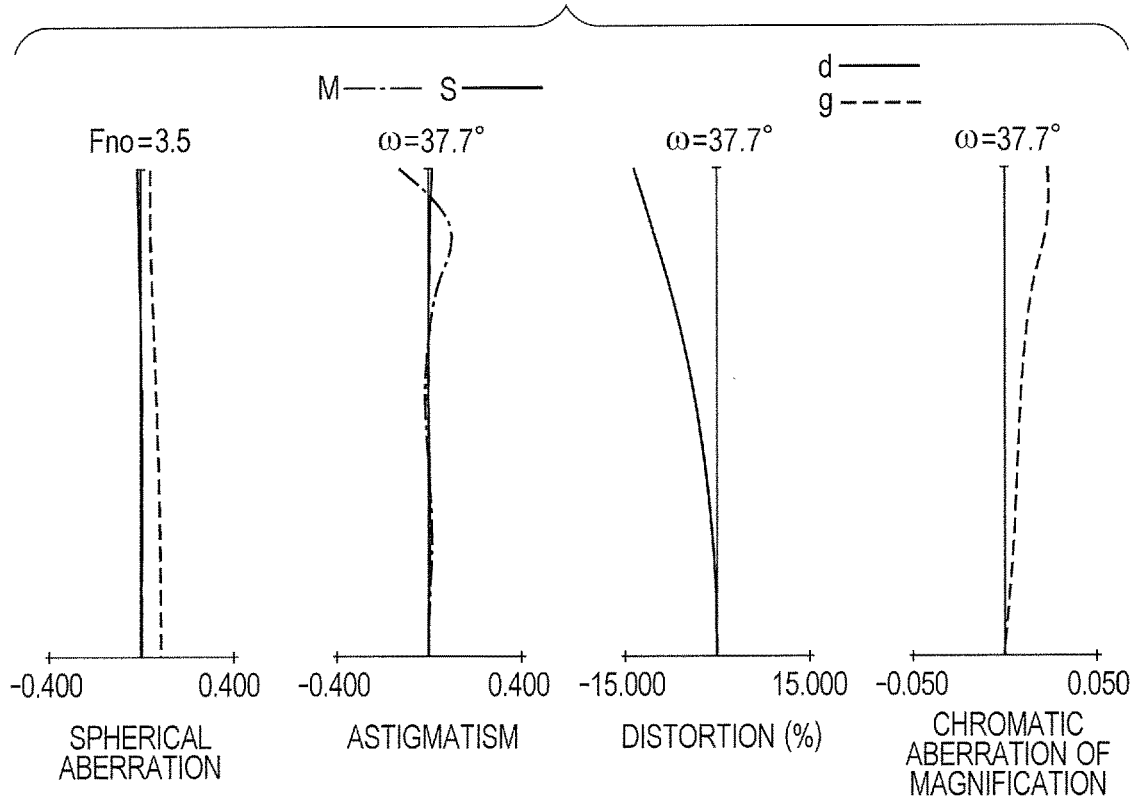
FIG. 2A is aberration diagrams in the state in which focus is at infinity at the wide angle end in Numerical Embodiment 1.
Figure 2B:
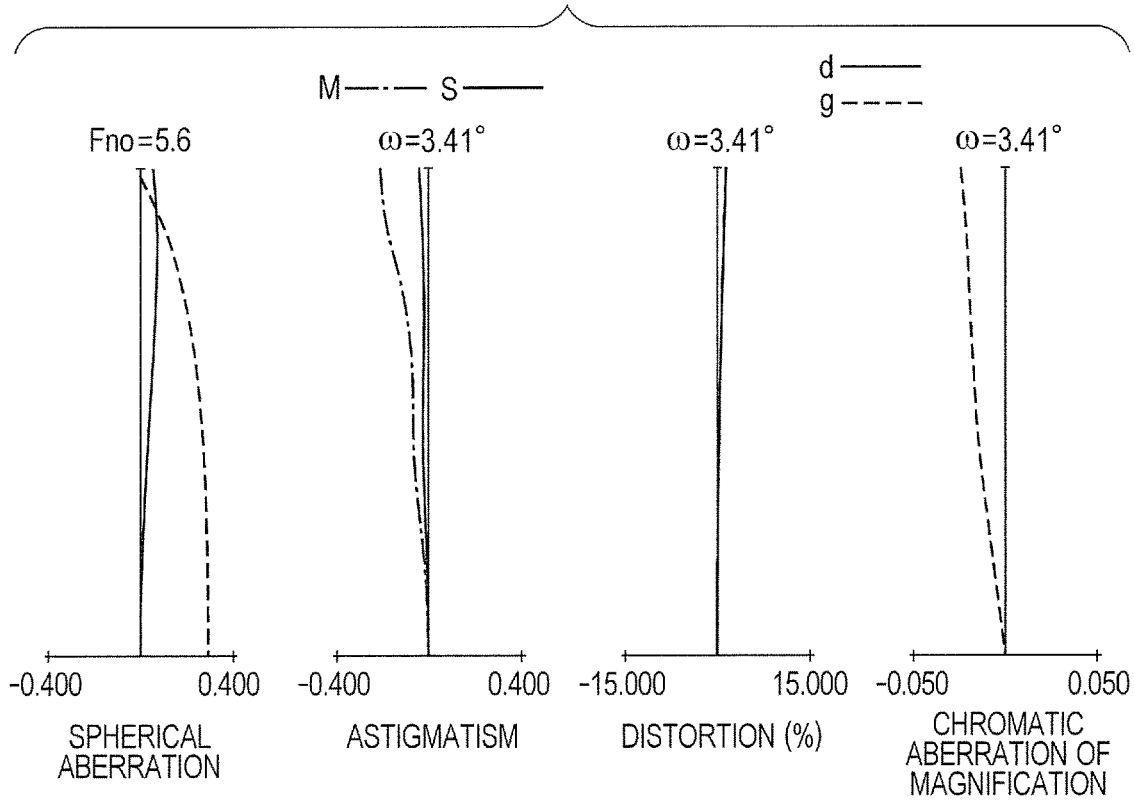
FIG. 2B is aberration diagrams in a state in which focus is at infinity at a telephoto end in Numerical Embodiment 1.

FIG. 1 is a lens cross-sectional view in a state in which focus is on an object at infinity at a wide angle end in Numerical Embodiment 1 corresponding to Embodiment 1 of the present invention. FIG. 2A and FIG. 2B are longitudinal aberration diagrams in states in which focus is on the object at infinity at the wide angle end and a telephoto end in Numerical Embodiment 1, respectively.

A zoom lens according to each Embodiment is an image pickup optical system used in an image pickup apparatus. In each of the lens cross-sectional views, the left side corresponds to the object side and the right side corresponds to the image side. In each of the lens cross-sectional views, there are illustrated a first lens unit L1 having a positive refractive power, a second lens unit L2 having a negative refractive power, a third lens unit L3 having a positive refractive power, a fourth lens unit L4 having a positive refractive power, and a fifth lens unit L5 corresponding to a rear lens group LR. An aperture stop SP is located between the second lens unit L2 and the third lens unit L3. The aperture stop SP in the zoom lens according to each Embodiment is configured not to move during zooming, but the aperture stop SP may be movable in an appropriate range. Further downsizing of the zoom lens is more easily achieved with the aperture stop SP that is movable during zooming, but in each Embodiment, the aperture stop SP is configured not to move during zooming so that the image pickup apparatus may have a simple structure. An optical filter P is an optical block corresponding to a face plate, for example. An image plane I corresponds to an image pickup surface of a solid-state image pickup element, for example, a CCD sensor or a CMOS sensor when the zoom lens is used as an image pickup optical system for, for example, a digital still camera or a video camera. The image plane I corresponds to a film surface when the zoom lens is used for a silver-halide film camera. Of the aberration diagrams, in each of the spherical aberration diagrams, a d-line is denoted by "d" and a g-line is denoted by "g". In each of the astigmatism diagrams, a meridional image plane and a sagittal image plane are denoted by ΔM and ΔS, respectively. Chromatic aberration of magnification is indicated by the g-line. Further, an F-number is denoted by Fno. A half angle of view (degree) is denoted by ω. In each Embodiment described later, the wide angle end and the telephoto end are zoom positions at the time when a magnification varying lens unit is located at the ends of a range in which the magnification varying lens unit is mechanically movable in an optical axis direction. In each Embodiment, during zooming from the wide angle end to the telephoto end, the second lens unit L2 moves toward the image side. Further, the third lens unit L3 moves to be located closer to the object side at the telephoto end than at the wide angle end. In this way, zooming is performed. Further, the fourth lens unit L4 is configured to nonlinearly move along an optical axis to correct an image plane variation accompanying zooming. Further, each Embodiment employs a rear focus type in which the fourth lens unit L4 is configured to move on the optical axis to perform focusing. Further, in each Embodiment, the fourth lens unit L4 is configured to extend toward the image side to perform focusing from the infinity to close distance at the telephoto end. In each Embodiment, when an image is taken, the third lens unit L3 may move in whole or in a part in a direction having a component in a direction vertical to the optical axis, to thereby correct a blur of the taken image that is generated when the zoom lens is vibrated. That is, image stabilization may be performed.

The zoom lens of each Embodiment includes, in order from the object side to the image side: a first lens unit having a positive refractive power and being configured to be fixed during zooming; a second lens unit having a negative refractive power and being configured to move during zooming; a third lens unit having a positive refractive power and being configured to move during zooming; a fourth lens unit having a negative refractive power and being configured to move during zooming; and a rear lens group having a positive refractive power as a whole. The fourth lens unit moves in the optical axis direction during focusing, and the following conditional expressions are satisfied:

$$-0.60 < f4/fR < -0.20 \quad (1);$$

$$-5.00 < M2/M3 < -1.50 \quad (2); \text{ and}$$

$$-0.42 < dskt/(fw \times \tan \omega w) < -0.15 \quad (3),$$

where f4 represents a focal length of the fourth lens unit, fR represents a combined focal length of the rear lens group at the telephoto end, fw represents a focal length of the entire system of the zoom lens at the wide angle end, M2 represents an amount of movement of the second lens unit during zooming from the wide angle end to the telephoto end, M3 represents an amount of movement of the third lens unit during zooming from the wide angle end to the telephoto end, ωw represents a half angle of view at the wide angle end, "dskt" (mm) represents an amount of displacement an in-focus position, which occurs when the fourth lens unit moves toward the image side by 1 (mm) in a state in which focus is at infinity at the telephoto end, and a sign of an amount of movement of a lens unit is positive when the lens unit is located closer to the object side at the telephoto end than at the wide angle end, and the sign is negative when the lens unit is located closer to the image side. Each of the differences in position M2 and M3 corresponds to the movement amount when the lens unit moves monotonously. When the lens units reciprocate, the movement amount does not include round trip distances, and each of the differences in position M2 and M3 corresponds to a difference between a position at the wide angle end and a position at the telephoto end in the optical axis direction.

Figure 12:
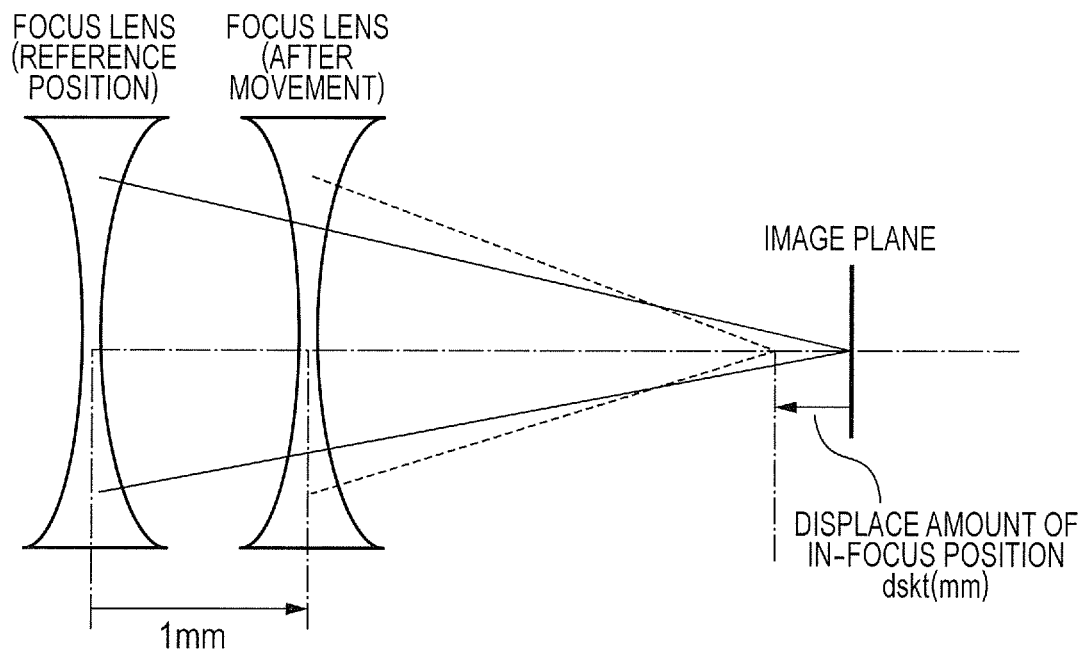
FIG. 12 is a schematic view for illustrating displacement of an in-focus position.

FIG. 12 is a view for illustrating displacement of an in-focus position described above. As illustrated in FIG. 12, when the fourth lens unit being the focusing lens unit moves in the optical axis direction toward the image by 1 (mm) with respect to a state in which an image forming position is in focus on the image plane, an image forming position of incident light moves by "dskt" (mm). This phenomenon is defined as displacement of the in-focus position, and an amount of the displacement is defined as a displacement amount of the in-focus position.

The zoom lens according to one embodiment of the present invention has the structure as described above, which is a structure suitable for obtaining a compact zoom lens having an increased zoom ratio. When the first lens unit L1 has eccentricity, curvature of field is not rotationally symmetric at the telephoto end, and as a result, focus is made with different object distances between the left and right of a screen, for example, which is not preferred. The first lens unit L1 is accordingly configured not to move during zooming. The second lens unit L2 and the third lens unit L3 are configured to move to perform zooming. The third lens unit L3 is configured to move so that an entrance pupil position may be short at an intermediate zoom position and a front lens may have a small effective diameter. The fourth lens unit L4 is configured to move to correct an image plane variation accompanying zooming.

The zoom lens of the present invention satisfies the above-described conditional expressions (1) to (3).

Next, technical meanings of the conditional expressions (1) to (3) are described.

The conditional expression (1) defines the ratio of the focal length f4 of the fourth lens unit to the combined focal length fR of the rear lens group at the telephoto end, which is arranged closer to the image side than the fourth lens unit. When the ratio exceeds the upper limit of the conditional expression (1), the refractive power of the fourth lens unit becomes excessively larger to increase variations in spherical aberration and curvature of field during focusing, and hence it becomes more difficult to obtain satisfactory optical performance. On the contrary, when the ratio falls below the lower limit of the conditional expression (1), the refractive power of the fourth lens unit becomes smaller to increase the amount of movement for focusing, and hence a total length tends to become larger and the downsizing becomes more difficult.

The conditional expression (2) defines a relationship between the amount of movement M2 of the second lens unit during zooming from the wide angle end to the telephoto end, and the amount of movement M3 of the third lens unit during zooming from the wide angle end to the telephoto end. When the ratio exceeds the upper limit of the conditional expression (2), the lens units other than the second lens unit, which serves as a main magnification varying unit, are required to move to achieve a suitable zoom ratio, and the amounts of movement of the lens units other than the second lens unit during zooming become larger. As a result, the lens total length tends to be long, and it becomes more difficult to achieve downsizing. On the contrary, when the ratio falls below the lower limit of the conditional expression (2), the amount of movement of the second lens unit becomes larger to increase the distance from the first lens unit to the aperture stop and increase the size of the first lens unit, and hence the downsizing becomes more difficult.

The conditional expression (3) defines the ratio of the amount "dskt" (mm) of displacement of the in-focus position, which occurs when the fourth lens unit moves toward the image side by 1 (mm) in the state in which focus is at infinity at the telephoto end, to the product "fw×tan ω" of a tangent of the half angle of view at the wide angle end and the focal length at the wide angle end. The product "fw×tan ω" is the maximum image height ("fw×tan ω" can be said as a half of an image circle "hic") of the entire system of the zoom lens and a half of the image size. In this case, the amount of movement of the focusing lens unit in focusing increases in proportion to a square of the focal length. Even at the same angle of view, a lens with a larger image size has a longer focal length by an amount corresponding to the image size ratio. Therefore, in the lens supporting a large-sized sensor, unless an amount of displacement in in-focus position, which occurs when the position of the focusing lens unit changes, is set to an appropriate amount, the amount of movement of the focusing lens unit during focusing becomes larger to increase a total lens length. In one embodiment of the present invention, the amount of displacement of the in-focus position, which occurs when the position of the focusing lens unit changes, is defined in an appropriate range so that the amount of movement of the focusing lens unit during focusing can be held small even in the lens having a large image size. When the ratio exceeds the upper limit of the conditional expression (3), the amount of movement of the fourth lens unit for focusing becomes larger, and hence the downsizing becomes more difficult. On the contrary, when the ratio falls below the lower limit of the conditional expression (3), the amount of movement of the fourth lens unit during focusing can be made small, but the amount of displacement of the focus at the time of minute movement of the fourth lens unit becomes excessively larger, and hence the driving control during focusing becomes more difficult.

It is more preferred to set the conditional expressions (1) to (3) as follows:

$$-0.58 < f4/fR < -0.25 \qquad (1a);$$

$$-4.50 < M2/M3 < -1.80 \qquad (2a); \text{ and}$$

$$-0.40 < dskt/(fw \times \tan \omega w) < -0.17 \qquad (3a).$$

In another mode of the zoom lens according to one embodiment of the present invention, it is desired to satisfy the following conditional expression:

$$3.5 < f1/fw < 8.5 \qquad (4).$$

The conditional expression (4) defines the ratio of the focal length of the first lens unit to the focal length of the entire system of the zoom lens at the wide angle end. When the ratio exceeds the upper limit of the conditional expression (4), the refractive power of the first lens unit becomes smaller to increase the amount of movement of the second lens unit required for obtaining a predetermined zoom ratio, and it thus becomes more difficult to reduce the total length and downsize the first lens unit. On the contrary, when the ratio falls below the lower limit of the conditional expression (4), the configuration is advantageous for the downsizing, but it thus becomes more difficult to satisfactorily correct the spherical aberration and the comatic aberration in the zooming position on the telephoto side.

It is more preferred to set the conditional expression (4) as follows:

$$3.7 < f1/fw < 8.2 \tag{4a}$$

In another mode of the zoom lens according to one embodiment of the present invention, it is desired to satisfy the following conditional expression:

$$-6.5 < f1/f2 < -4.0 \tag{5}$$

where f2 represents the focal length of the second lens unit at the wide angle end.

The conditional expression (5) defines the ratio of the focal length of the first lens unit to the focal length of the second lens unit at the wide angle end. When the ratio exceeds the upper limit of the conditional expression (5), it becomes more difficult to correct the spherical aberration and the comatic aberration in the zooming position on the telephoto side. On the contrary, when the ratio falls below the lower limit of the conditional expression (5), it becomes more difficult to correct astigmatism in the zooming position on the wide range side.

It is more preferred to set the conditional expression (5) as follows:

$$-6.3 < f1/f2 < -4.2 \tag{5a}$$

In another mode of the zoom lens according to one embodiment of the present invention, it is desired to satisfy the following conditional expression:

$$-7.0 < f1/f4 < -2.0 \tag{6}$$

The conditional expression (6) defines the ratio of the focal length of the first lens unit to the focal length of the fourth lens unit. When the ratio exceeds the upper limit of the conditional expression (6), the refractive power of the first lens unit becomes excessively larger, and it thus becomes more difficult to correct the spherical aberration and the comatic aberration in the zooming position on the telephoto side. On the contrary, when the ratio falls below the lower limit of the conditional expression (6), the refractive power of the fourth lens unit becomes excessively larger to increase variations in spherical aberration and curvature of field during focusing, and hence it becomes more difficult to obtain satisfactory optical performance.

It is more preferred to set the conditional expressions (6) as follows:

$$-6.8 < f1/f4 < -2.3 \tag{6a}$$

In another mode of the zoom lens according to one embodiment of the present invention, it is preferred that the aperture stop be arranged between the second lens unit and the third lens unit. The aperture stop is arranged between the second lens unit and the third lens unit, which are configured to move during zooming, and hence the second lens unit and the third lens unit move by appropriately provided amounts so that a distance from the first lens unit to the aperture stop may be controlled. In this way, the effective diameter of the first lens unit can be easily reduced.

As a further aspect of the zoom lens according to one embodiment of the present invention, the first lens unit includes three or more lenses. In order to reduce an effective diameter of the first lens unit, it is effective to increase a refractive index of a material for the positive lens being the lens closest to the image side among the positive lenses constructing the first lens unit. However, a glass material having a high refractive index tends to have a large Abbe number, and hence, when the material with a high refractive index is used for the positive lens, it is particularly difficult to correct axial comatic aberration at the telephoto end. Therefore, a positive lens is added and a material with small dispersion is used as the material, to thereby enable reduction in effective diameter of the first lens unit, as well as satisfactory correction of the axial comatic aberration at the telephoto end. In addition, the effect of decreasing the curvature of each surface of the lenses constructing the first lens unit is obtained, thus enabling satisfactory correction of the comatic aberration and the spherical aberration in the zooming position on the telephoto side.

In another mode of the zoom lens according to one embodiment of the present invention, it is desired to satisfy the following conditional expression:

$$0.99 < Nd1pr/Nd1pf < 1.40 \tag{7}$$

The conditional expression (7) defines the relationship between a refractive index Nd1pr of a material for a positive lens G1pr arranged closest to the image side among the positive lenses constructing the first lens unit and an average value Nd1pf of refractive indices of materials for the positive lenses other than the positive lens G1pr arranged closest to the image side among the positive lenses constructing the first lens unit.

In the first lens unit, an angle formed by a light beam passing through the lens and the optical axis becomes the largest in the positive lens G1pr closest to the image side. Therefore, when the positive lens G1pr closest to the image side is reduced in thickness in the first lens unit, a difference in light beam effective diameter between the object-side lens surface and the image-side lens surface decreases to facilitate reduction in effective diameter of the front lens. However, when the refractive power of the positive lens G1pr closest to the image side is set to be small in the first lens unit, the light beam is caused to pass closer to the object side at an acute angle with respect to the optical axis, thus increasing the effective diameter of the front lens. Therefore, in order to reduce the effective diameter of the front lens, it is effective to increase the refractive index of the material for the positive lens G1pr closest to the image side in the first lens unit so as to increase the curvature diameter of the lens surface and reduce the thickness of the lens while maintaining the refractive power at a fixed position.

When the ratio exceeds the upper limit of the conditional expression (7), the effective diameter of the lens constructing the first lens unit is reduced with ease, which is advantageous for the downsizing, but a Petzval sum increases and it thus becomes more difficult to correct the curvature of field. On the contrary, when the ratio falls below the lower limit of the conditional expression (7), it is difficult to reduce the effective diameter of the lens arranged closer to the object side of the first lens unit, and hence the downsizing becomes more difficult.

It is more preferred to set the conditional expression (7) as follows:

$$0.99 < Nd1pr/Nd1pf < 1.35 \quad (7a).$$

As a further aspect of the zoom lens according to one embodiment of the present invention, it is preferred that the aperture stop not move in the optical axis direction during zooming. When the aperture stop moves during zooming, it is required to move the aperture stop together with a mechanism for controlling an aperture size, which complicates the driving mechanism, and an increase in power consumption for driving accompanied by the complication cannot be avoided.

In another mode of the zoom lens according to one embodiment of the present invention, it is desired to satisfy the following conditional expression:

$$14.0 < fw \times \tan \omega w \quad (8).$$

The conditional expression (8) defines a product "fw×tan ω" of the tangent of the half angle of view at the wide angle end and the focal length at the wide angle end. The product "fw×tan ω" is the maximum image height of the entire system of the zoom lens and a half of the image size. Through satisfaction of the conditional expression (8), it is possible to obtain a lens having a large image size and supporting an increase in size of the solid-state image pickup element.

It is more preferred to set the conditional expression (8) as follows:

$$16.0 < fw \times \tan \omega w < 24.0 \quad (8a).$$

Now, a specific configuration of the zoom lens according to one embodiment of the present invention is described by way of features of lens configurations of Numerical Embodiments 1 to 5 corresponding to Embodiments 1 to 5, respectively.

Embodiment 1

The first lens unit L1 in Embodiment 1 is described. The first lens unit L1 corresponds to a first surface to a seventh surface. The first lens unit L1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens unit L2 corresponds to an eighth surface to a fifteenth surface, and includes a meniscus concave lens having a convex surface on the object side, a biconcave lens, a biconvex lens, and a meniscus concave lens having a convex surface on the image side. Further, the ninth surface has an aspherical shape, and mainly corrects variations in curvature of field and comatic aberration at a peripheral image height accompanying zooming. The third lens unit L3 corresponds to a seventeenth surface to a twenty-fourth surface, and includes a meniscus convex lens having a convex surface on the object side, a cemented lens obtained by cementing a meniscus concave lens having a convex surface on the object side and a convex lens, and a cemented lens obtained by cementing a biconvex lens and a biconcave lens. Further, the eighteenth surface has an aspherical shape, and mainly corrects a variation in spherical aberration accompanying zooming. The fourth lens unit L4 corresponds to a twenty-fifth surface to a twenty-seventh surface, and includes a cemented lens obtained by cementing a meniscus convex lens having a convex surface on the image side and a biconcave lens. Further, the fourth lens unit L4 is a focusing lens unit configured to move toward the image side during focusing from an infinity side to a proximity side. The fifth lens unit being the rear lens group LR corresponds to a twenty-eighth surface to a thirty-second surface, and includes a cemented lens obtained by cementing a biconvex lens and a meniscus concave lens having a convex surface on the image side, and a biconvex lens.

Numerical Embodiment 1, which corresponds to Embodiment 1 described above, is described. In all Numerical Embodiments without limiting to Numerical Embodiment 1, the order of a surface (optical surface) from the object side is represented by "i", a curvature radius of the i-th surface from the object side is represented by "ri", and an interval between the i-th surface and the (i+1)-th surface from the object side (on the optical axis) is represented by "di". Moreover, a refractive index and an Abbe number of a medium (optical member) between the i-th surface and the (i+1)-th surface are represented by "ndi" and "vdi", respectively, and an air-equivalent back focus is represented by BF. When an X axis is set in the optical axis direction, an H axis is set in a direction perpendicular to the optical axis, a direction of travel of light is defined as positive, a paraxial curvature radius is represented by R, a conic constant is represented by "k", and aspherical coefficients are represented by A4, A6, A8, A10, and A12, the aspherical shape is expressed by the expression below. Moreover, "e-Z" means "×10$^{-Z}$". The half angle of view is a value obtained by ray tracing.

$$X = \frac{H^2/R}{1 + \sqrt{1 - (1+k)(H/R)^2}} + A4H^4 + A6H^6 + A8H^8 + A10H^{10} + A12H^{12}$$

The values of Embodiment 1 corresponding to the respective conditional expressions are shown in Table 1. Embodiment 1 satisfies the expressions (1) to (8), and achieves the zoom lens which is downsized and provided with a high zooming ratio and has high optical performance over the entire zoom range, although being an optical system with a large image size. It is essential that the zoom lens according to one embodiment of the present invention satisfy the expressions (1) to (3), but the zoom lens is always required to satisfy the expressions (4) to (8). However, when at least one of the expressions (4) to (8) is satisfied, even better effects may be provided. This is also true for the other Embodiments.

Figure 11:
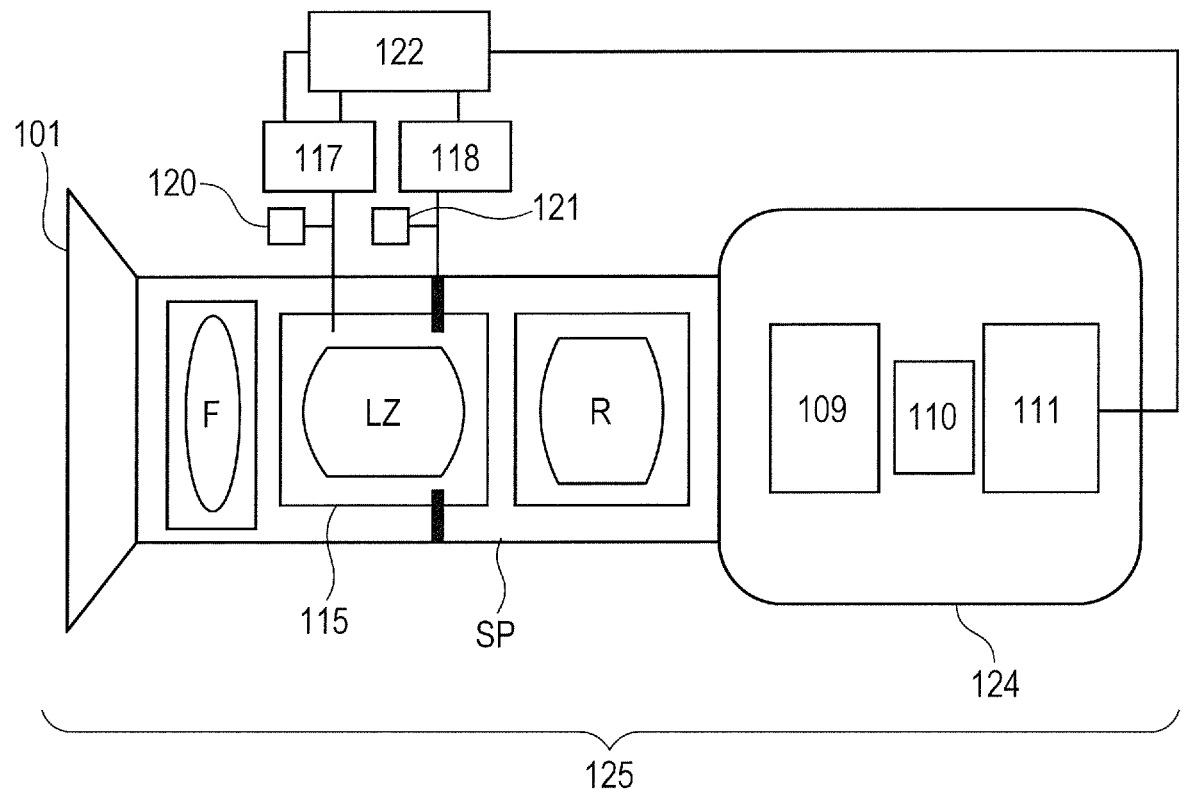
FIG. 11 is a schematic diagram for illustrating a main part of a video camera (image pickup apparatus) having mounted thereon a zoom lens according to one embodiment of the present invention.

FIG. 11 is a schematic diagram of an image pickup apparatus (television camera system) using the zoom lens according to each of Embodiments as an image pickup optical system. In FIG. 11, the zoom lens according to any one of Embodiments 1 to 5, which is denoted by 101, and a camera 124 are illustrated. The zoom lens 101 is configured to be detachably attachable to the camera 124. An image pickup apparatus 125 is formed by attaching the zoom lens 101 to the camera 124. The zoom lens 101 includes a first lens unit F, a magnification varying portion LZ, and a rear lens group R. The magnification varying portion LZ includes a lens unit for focusing. The magnification varying portion LZ includes the second lens unit and the third lens unit configured to move on the optical axis for zooming, and the fourth lens unit configured to move on the optical axis to correct an image plane variation accompanying zooming. The fourth lens unit also serves as the focusing lens unit configured to move toward the image side during focusing from an infinity side to a proximity side. An aperture stop is denoted by SP. A drive mechanism 115, such as helicoids or cams, is configured to drive the first lens unit F and the magnification varying portion LZ in the optical axis direction. Motors (drive units) 117 and 118 are configured to electrically drive the drive mechanism 115 and the aperture stop SP, respectively. Detectors 120 and 121, such as encoders, potentiometers, or photosensors, are configured to detect the position of the magnification varying portion LZ on the optical axis, and an aperture diameter of the aperture stop SP, respectively. In the camera 124, a glass block 109 corresponds to an optical filter or a color separation optical system in the camera 124, and a solid-state image pickup element (photoelectric conversion element) 110, such as a CCD sensor or a CMOS sensor, is configured to receive light of an object image formed by the zoom lens 101. When an electronic image pickup element is used, the image quality of output images can be further increased through electronic correction of aberration. Moreover, CPUs 111 and 122 are configured to control various kinds of driving of the camera 124 and the zoom lens 101, respectively.

As described above, the zoom lens according to one embodiment of the present invention is applied to a digital video camera, a television camera, or a cinema camera to implement an image pickup apparatus having high optical performance.

Embodiment 2

Figure 3:
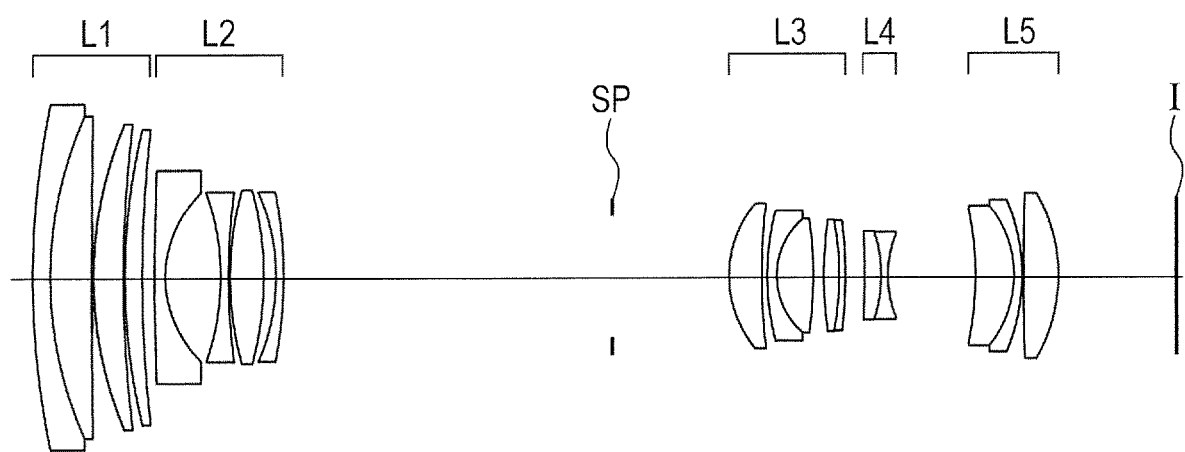
FIG. 3 is a lens cross-sectional view in a state in which focus is at infinity at a wide angle end in Embodiment 2 (Numerical Embodiment 2) of the present invention.
Figure 4A:
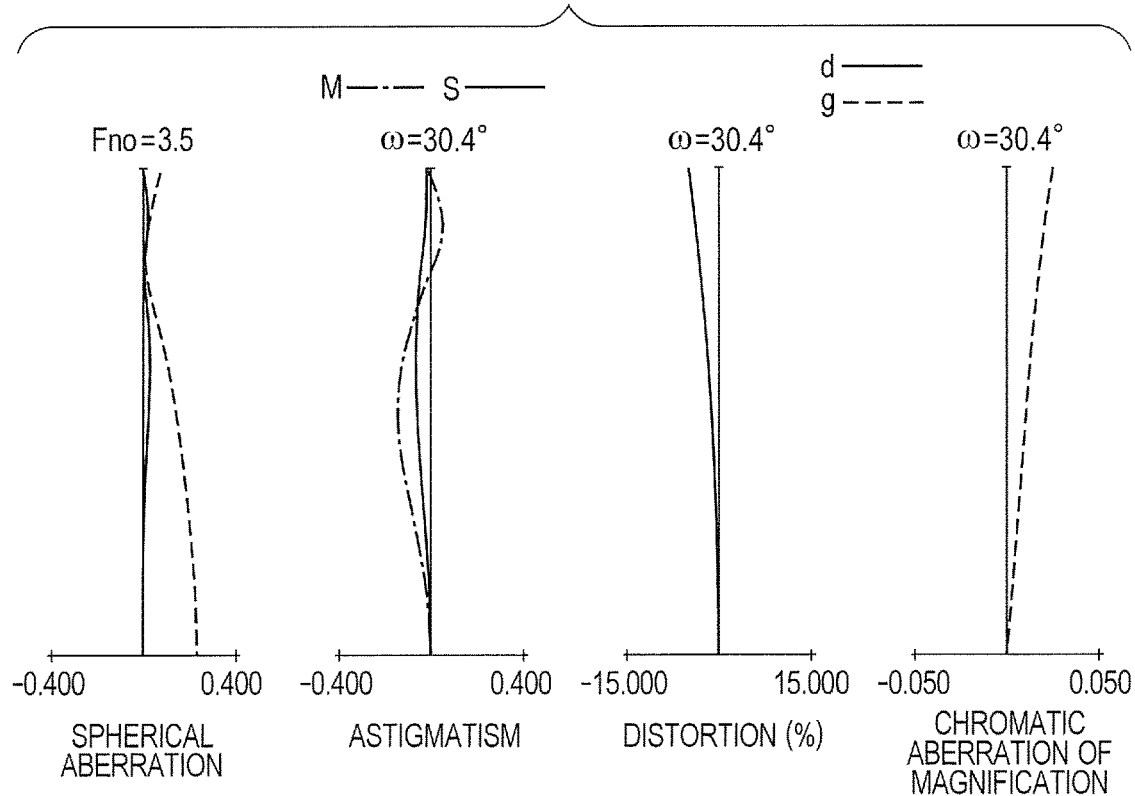
FIG. 4A is aberration diagrams in the state in which focus is at infinity at the wide angle end in Numerical Embodiment 2.
Figure 4B:
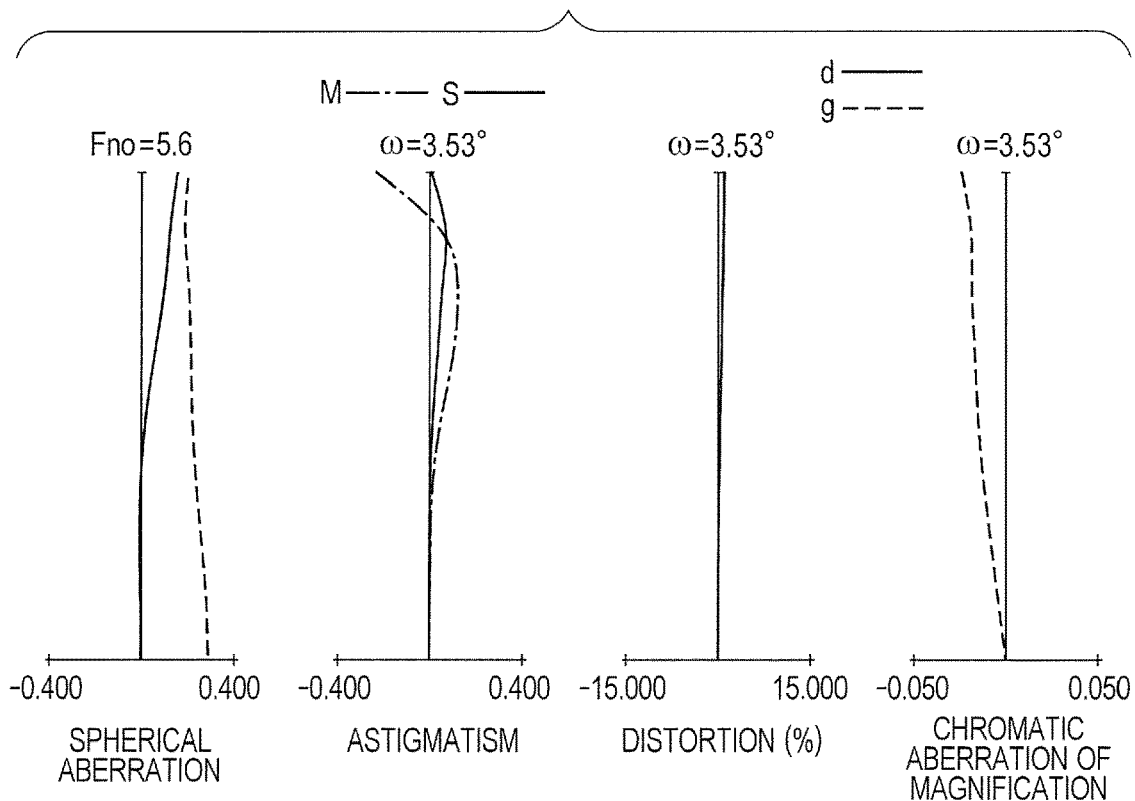
FIG. 4B is aberration diagrams in a state in which focus is at infinity at a telephoto end in Numerical Embodiment 2.

FIG. 3 is a lens cross-sectional view when the focus is at the infinity at a wide angle end in a zoom lens according to Embodiment 2 (Numerical Embodiment 2) of the present invention. FIG. 4A and FIG. 4B are longitudinal aberration diagrams at the wide angle end and a telephoto end, respectively. Each of the aberration diagrams is the longitudinal aberration diagram at the time when the focus is at the infinity. In FIG. 3, the zoom lens includes, in order from the object side, a first lens unit L1, which has a positive refractive power. The zoom lens further includes a second lens unit L2 for zooming, which is configured to move toward the image side during zooming from the wide angle end to the telephoto end, and has a negative refractive power. The zoom lens further includes a third lens unit L3 for zooming, which is configured to move on the optical axis nonlinearly during zooming from the wide angle end to the telephoto end, and has a positive refractive power. The zoom lens further includes a negative fourth lens unit L4, which is configured to move on the optical axis nonlinearly in conjunction with the movement of the second lens unit and the third lens unit, to thereby correct an image plane variation accompanying zooming. In addition, the fourth lens unit moves toward the image side during focusing from an infinity side to a proximity side. The zoom lens further includes a fifth lens unit L5 being a rear lens group LR having a positive refractive power, which is configured not to move for zooming, and has an image forming action. An aperture stop is denoted by SP, and an image plane is denoted by I.

Next, the first lens unit L1 in Embodiment 2 is described. The first lens unit L1 corresponds to a first surface to a seventh surface. The first lens unit L1 includes a cemented lens obtained by cementing a meniscus concave lens having a convex surface on the object side and a meniscus convex lens having a convex surface on the object side, a meniscus convex lens having a convex surface on the object side, and a meniscus convex lens having a convex surface on the object side. The second lens unit L2 corresponds to an eighth surface to a fifteenth surface, and includes a meniscus concave lens having a convex surface on the object side, a biconcave lens, a biconvex lens, and a meniscus concave lens having a convex surface on the image side. Further, the ninth surface has an aspherical shape, and mainly corrects variations in curvature of field and comatic aberration at a peripheral image height accompanying zooming. The third lens unit L3 corresponds to a seventeenth surface to a twenty-fourth surface, and includes a meniscus convex lens having a convex surface on the object side, a cemented lens obtained by cementing a meniscus concave lens having a convex surface on the object side and a biconvex lens, and a cemented lens obtained by cementing a biconvex lens and a meniscus concave lens having a convex surface on the image side. Further, the seventeenth surface and the eighteenth surface each have an aspherical shape, and mainly correct a variation in curvature of field accompanying zooming. The fourth lens unit L4 corresponds to a twenty-fifth surface to a twenty-seventh surface, and includes a cemented lens obtained by cementing a meniscus convex lens having a convex surface on the image side and a biconcave lens. Further, the fourth lens unit L4 is a focusing lens unit configured to move toward the image side during focusing from the infinity side to the proximity side. The fifth lens unit being the rear lens group LR corresponds to a twenty-eighth surface to a thirty-second surface, and includes a cemented lens obtained by cementing a meniscus convex lens having a convex surface on the image side and a meniscus concave lens having a convex surface on the image side, and a biconvex lens.

The values of Embodiment 2 corresponding to the respective conditional expressions are shown in Table 1. Embodiment 2 satisfies the expressions (1) to (8), and achieves the zoom lens which is downsized and provided with a high zooming ratio and has high optical performance over the entire zoom range, although being an optical system with a large image size.

Embodiment 3

Figure 5:
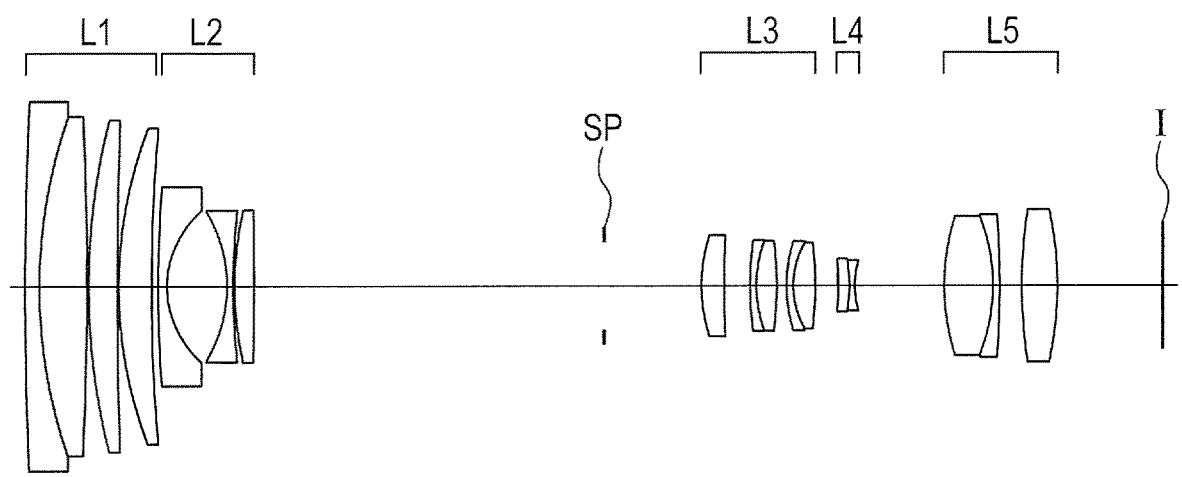
FIG. 5 is a lens cross-sectional view in a state in which focus is at infinity at a wide angle end in Embodiment 3 (Numerical Embodiment 3) of the present invention.
Figure 6A:
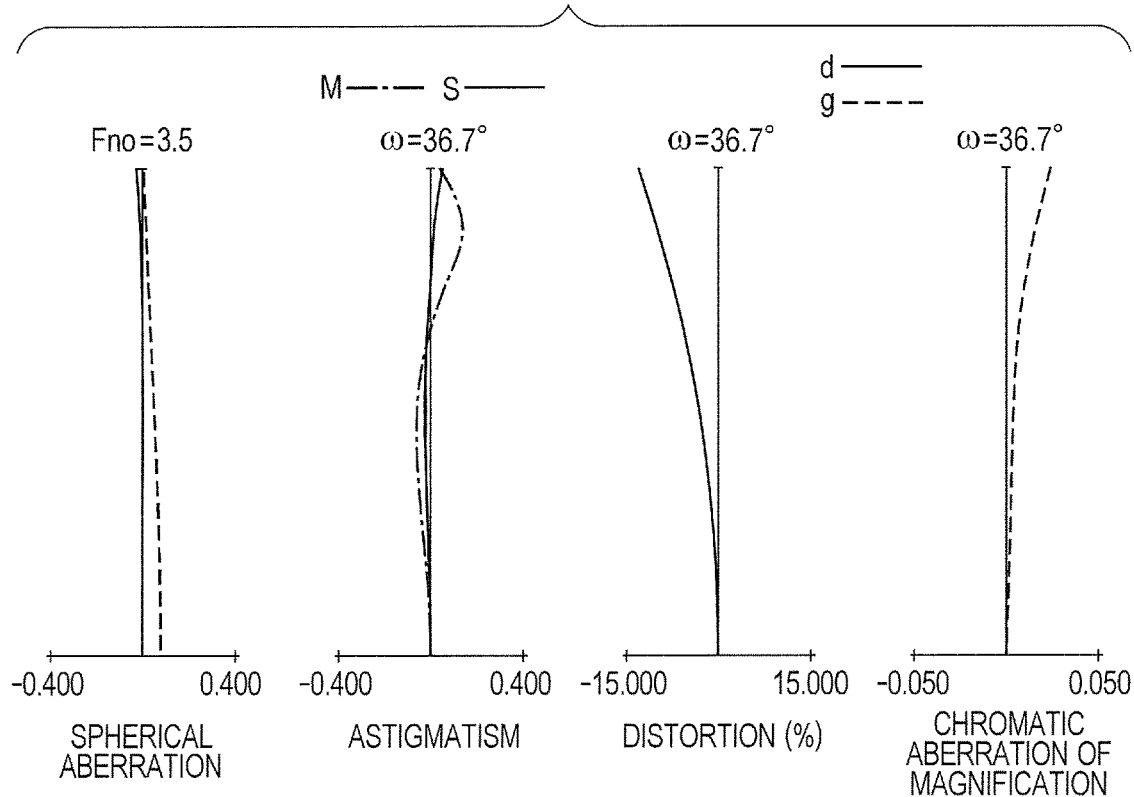
FIG. 6A is aberration diagrams in the state in which focus is at infinity at the wide angle end in Numerical Embodiment 3.
Figure 6B:
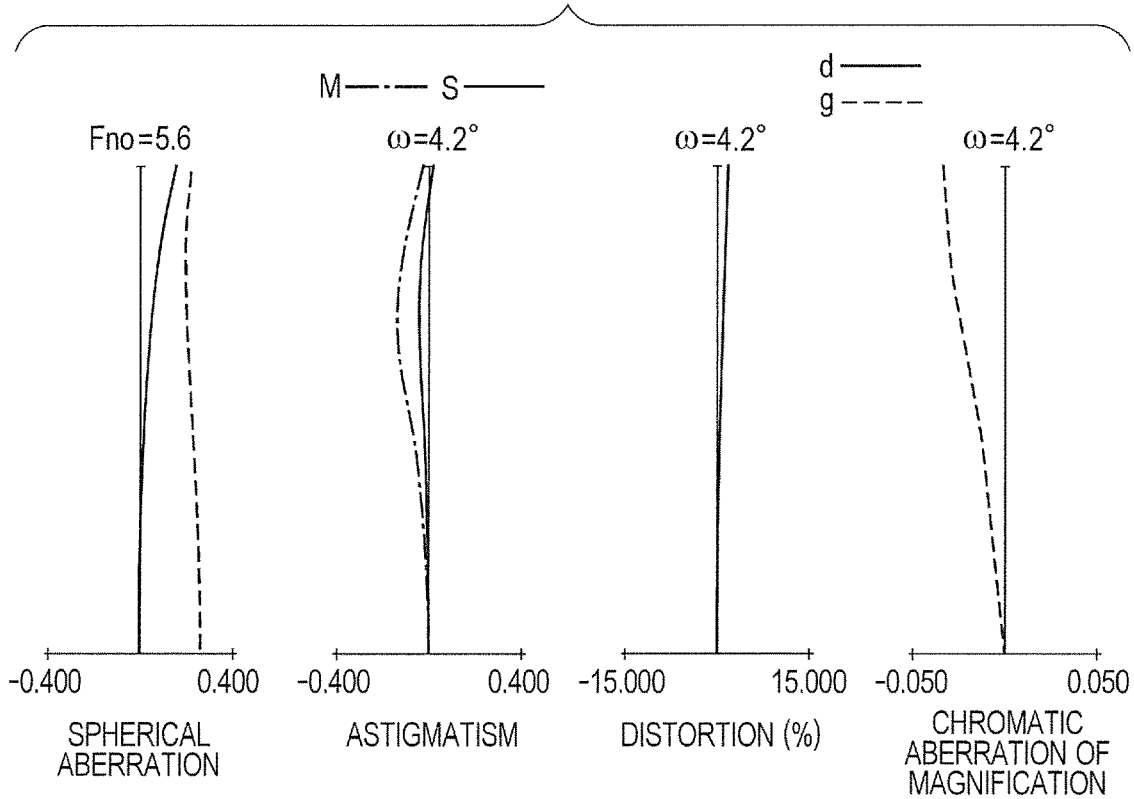
FIG. 6B is aberration diagrams in a state in which focus is at infinity at a telephoto end in Numerical Embodiment 3.

FIG. 5 is a lens cross-sectional view at the time when the focus is at the infinity at a wide angle end in a zoom lens according to Embodiment 3 (Numerical Embodiment 3) of the present invention. FIG. 6A and FIG. 6B are longitudinal aberration diagrams at the wide angle end and a telephoto end, respectively. Each of the aberration diagrams is the longitudinal aberration diagram at the time when the focus is at the infinity. In FIG. 5, the zoom lens includes, in order from the object side to the image side, a first lens unit L1, which has a positive refractive power. The zoom lens further includes a second lens unit L2 for zooming, which is configured to move toward the image side during zooming from the wide angle end to the telephoto end, and has a negative refractive power. The zoom lens further includes a third lens unit L3 for zooming, which is configured to move on the optical axis nonlinearly during zooming from the wide angle end to the telephoto end, and has a positive refractive power. The zoom lens further includes a negative fourth lens unit L4, which is configured to move on the optical axis nonlinearly in conjunction with the movement of the second lens unit and the third lens unit, to thereby correct an image plane variation accompanying zooming. In addition, the fourth lens unit moves toward the image side during focusing from an infinity side to a proximity side. The zoom lens further includes a fifth lens unit L5 being a rear lens group LR having a positive refractive power, which is configured not to move for zooming, and has an image forming action. An aperture stop is denoted by SP, and an image plane is denoted by I.

Next, the first lens unit L1 in Embodiment 3 is described. The first lens unit L1 corresponds to a first surface to a seventh surface. The first lens unit L1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens unit L2 corresponds to an eighth surface to a thirteenth surface, and includes a meniscus concave lens having a convex surface on the object side, a biconcave lens, and a biconvex lens. Further, the ninth surface has an aspherical shape, and mainly corrects variations in curvature of field and comatic aberration at a peripheral image height accompanying zooming. The third lens unit L3 corresponds to a fifteenth surface to a twenty-second surface, and includes a meniscus convex lens having a convex surface on the object side, a cemented lens obtained by cementing a meniscus concave lens having a convex surface on the object side and a biconvex lens, and a cemented lens obtained by cementing a meniscus concave lens having a convex surface on the image side and a biconvex lens. Further, the sixteenth surface has an aspherical shape, and mainly corrects a variation in spherical aberration accompanying zooming. The fourth lens unit L4 corresponds to a twenty-third surface to a twenty-fifth surface, and includes a cemented lens obtained by cementing a meniscus convex lens having a convex surface on the image side and a biconcave lens. The twenty-fifth surface has an aspherical shape, and corrects variations in spherical aberration and curvature of field accompanying focusing. Further, the fourth lens unit L4 is a focusing lens unit configured to move toward the image side during focusing from the infinity side to the proximity side. The fifth lens unit being the rear lens group LR corresponds to a twenty-sixth surface to a thirty surface, and includes a cemented lens obtained by cementing a biconvex lens and a meniscus convex lens having a convex surface on the image side, and a biconvex lens.

The values of Embodiment 3 corresponding to the respective conditional expressions are shown in Table 1. Embodiment 3 satisfies the expressions (1) to (8), and achieves the zoom lens which is downsized and provided with a high zooming ratio and has high optical performance over the entire zoom range, although being an optical system with a large image size.

Embodiment 4

Figure 7:
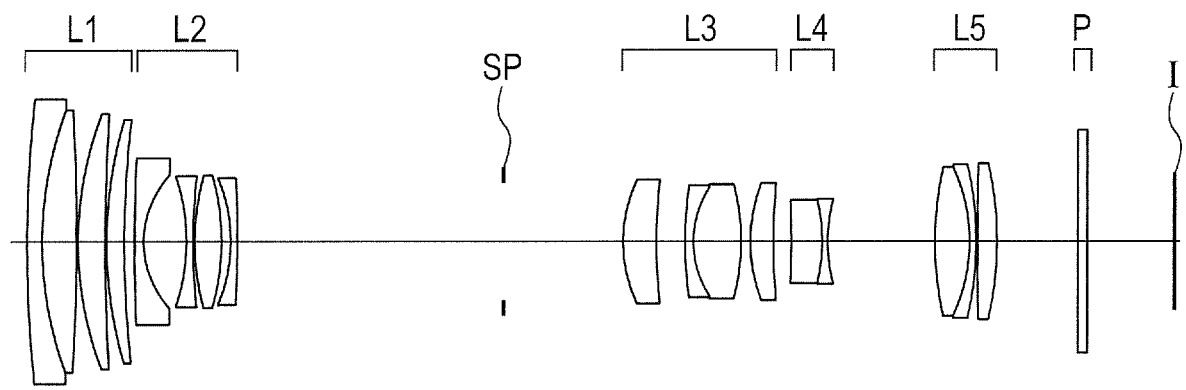
FIG. 7 is a lens cross-sectional view in a state in which focus is at infinity at a wide angle end in Embodiment 4 (Numerical Embodiment 4) of the present invention.
Figure 8A:
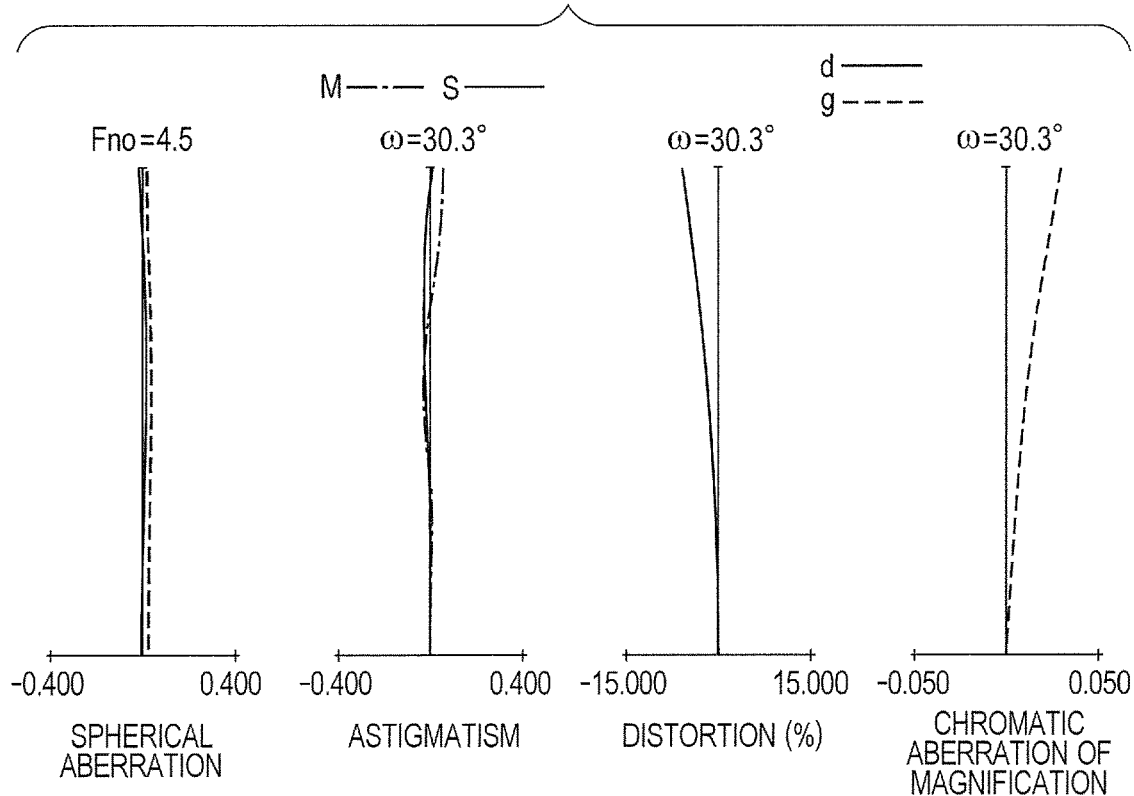
FIG. 8A is aberration diagrams in the state in which focus is at infinity at the wide angle end in Numerical Embodiment 4.
Figure 8B:
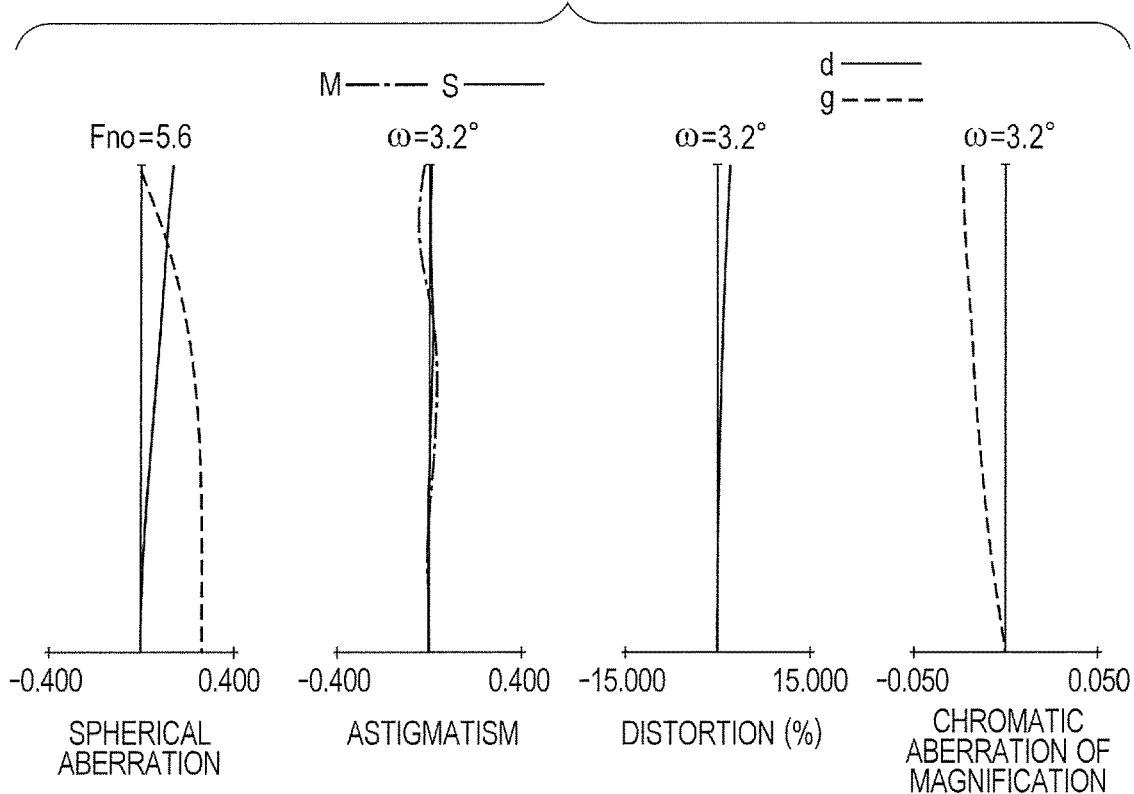
FIG. 8B is aberration diagrams in a state in which focus is at infinity at a telephoto end in Numerical Embodiment 4.

FIG. 7 is a lens cross-sectional view at the time when the focus is at the infinity at a wide angle end in a zoom lens according to Embodiment 4 (Numerical Embodiment 4) of the present invention. FIG. 8A and FIG. 8B are longitudinal aberration diagrams at the wide angle end and a telephoto end, respectively. Each of the aberration diagrams is the longitudinal aberration diagram at the time when the focus is at the infinity. In FIG. 7, the zoom lens includes, in order from the object side to the image side, a first lens unit L1, which has a positive refractive power. The zoom lens further includes a second lens unit L2 for zooming, which is configured to move toward the image side during zooming from the wide angle end to the telephoto end, and has a negative refractive power. The zoom lens further includes a third lens unit L3 for zooming, which is configured to move on the optical axis nonlinearly during zooming from the wide angle end to the telephoto end, and has a positive refractive power. The zoom lens further includes a negative fourth lens unit L4, which is configured to move on the optical axis nonlinearly in conjunction with the movement of the second lens unit and the third lens unit, to thereby correct an image plane variation accompanying zooming. In addition, the fourth lens unit moves toward the image side during focusing from an infinity side to a proximity side. The zoom lens further includes a fifth lens unit L5 being a rear lens group LR having a positive refractive power, which is configured not to move for zooming, and has an image forming action. An aperture stop is denoted by SP, and an image plane is denoted by I.

Next, the first lens unit L1 in Embodiment 4 is described. The first lens unit L1 corresponds to a first surface to a seventh surface. The first lens unit L1 includes a cemented lens obtained by cementing a meniscus concave lens having a convex surface on the object side and a biconvex lens, a meniscus convex lens having a convex surface on the object side, and a meniscus convex lens having a convex surface on the object side. The second lens unit L2 corresponds to an eighth surface to a fifteenth surface, and includes a meniscus concave lens having a convex surface on the object side, a biconcave lens, a biconvex lens, and a meniscus concave lens having a convex surface on the image side. Further, the ninth surface has an aspherical shape, and mainly corrects variations in curvature of field and comatic aberration at a peripheral image height accompanying zooming. The third lens unit L3 corresponds to a seventeenth surface to a twenty-third surface, and includes a meniscus convex lens having a convex surface on the object side, a cemented lens obtained by cementing a meniscus concave lens having a convex surface on the object side and a biconvex lens, and a meniscus convex lens having a convex surface on the image side. Further, the eighteenth surface has an aspherical shape, and mainly corrects a variation in curvature of field accompanying zooming. The fourth lens unit L4 corresponds to a twenty-fourth surface to a twenty-sixth surface, and includes a cemented lens obtained by cementing a meniscus convex lens having a convex surface on the image side and a biconcave lens. The twenty-sixth surface has an aspherical shape, and corrects variations in spherical aberration and curvature of field generated due to focusing. Further, the fourth lens unit L4 is a focusing lens unit configured to move toward the image side during focusing from the infinity side to the proximity side. The fifth lens unit being the rear lens group LR corresponds to a twenty-seventh surface to a thirty-first surface, and includes a cemented lens obtained by cementing a biconvex lens and a meniscus concave lens having a convex surface on the image side, and a biconvex lens.

The values of Embodiment 4 corresponding to the respective conditional expressions are shown in Table 1. Embodiment 4 satisfies the expressions (1) to (8), and achieves the zoom lens which is downsized and provided with a high zooming ratio and has high optical performance over the entire zoom range, although being an optical system with a large image size.

Embodiment 5

Figure 9:
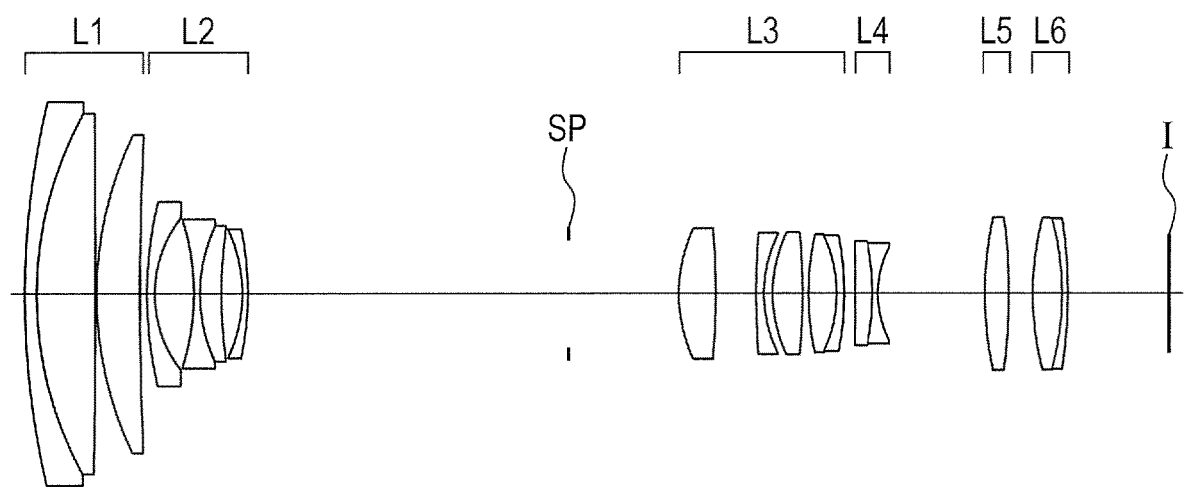
FIG. 9 is a lens cross-sectional view in a state in which focus is at infinity at a wide angle end in Embodiment 5 (Numerical Embodiment 5) of the present invention.
Figure 10A:
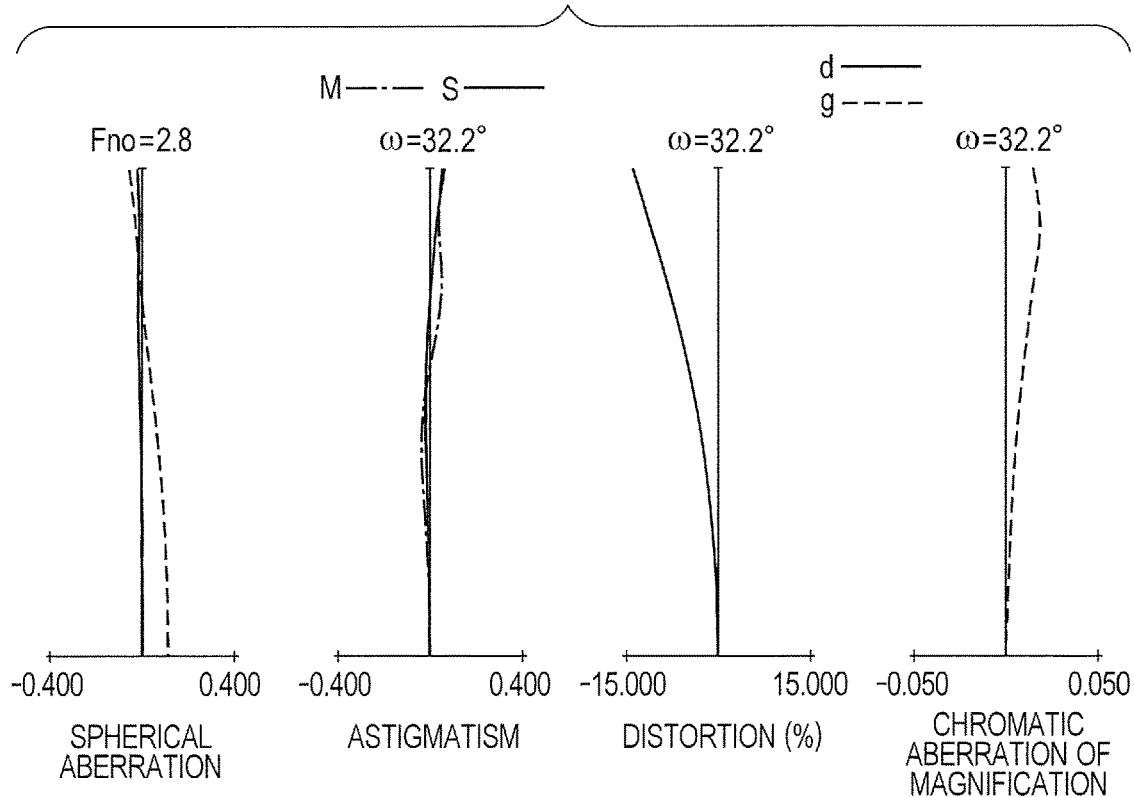
FIG. 10A is aberration diagrams in the state in which focus is at infinity at the wide angle end in Numerical Embodiment 5.
Figure 10B:
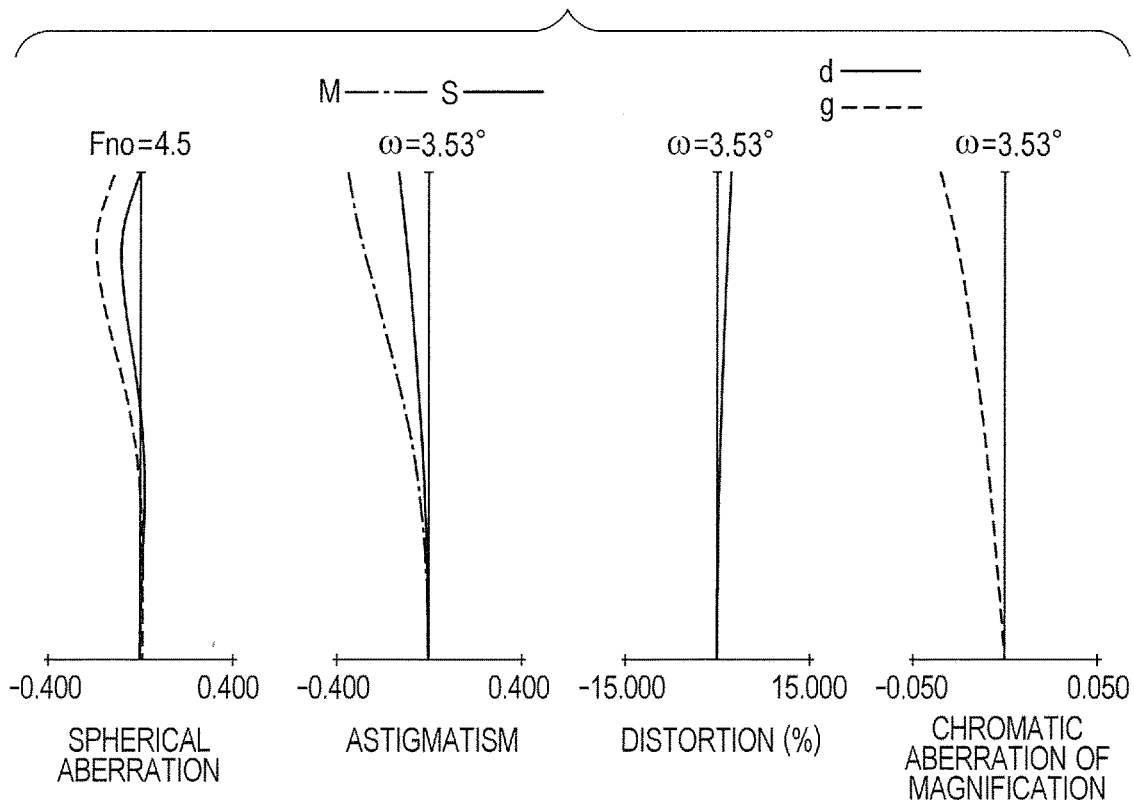
FIG. 10B is aberration diagrams in a state in which focus is at infinity at a telephoto end in Numerical Embodiment 5.

FIG. 9 is a lens cross-sectional view at the time when the focus is at the infinity at a wide angle end in a zoom lens according to Embodiment 5 (Numerical Embodiment 5) of the present invention. FIG. 10A and FIG. 10B are longitudinal aberration diagrams at the wide angle end and a telephoto end, respectively. Each of the aberration diagrams is the longitudinal aberration diagram at the time when the focus is at the infinity. In FIG. 9, the zoom lens includes, in order from the object side to the image side, a first lens unit L1, which has a positive refractive power. The zoom lens further includes a second lens unit L2 for zooming, which is configured to move toward the image side during zooming from the wide angle end to the telephoto end, and has a negative refractive power. The zoom lens further includes a third lens unit L3 for zooming, which is configured to move on the optical axis nonlinearly during zooming from the wide angle end to the telephoto end, and has a positive refractive power. The zoom lens further includes a negative fourth lens unit L4, which is configured to move on the optical axis nonlinearly in conjunction with the movement of the second lens unit and the third lens unit, to thereby correct an image plane variation accompanying zooming. In addition, the fourth lens unit moves toward the image side during focusing from an infinity side to a proximity side. The zoom lens further includes, as a rear lens group LR, a fifth lens unit L5, which has a positive refractive power and is configured to move for zooming, and a sixth lens unit L6, which has a positive refractive power, is configured not to move for zooming, and has an image forming action. An aperture stop is denoted by SP, and an image plane is denoted by I.

Next, the first lens unit L1 in Embodiment 5 is described. The first lens unit L1 corresponds to a first surface to a fifth surface. The first lens unit L1 includes a cemented lens obtained by cementing a meniscus concave lens having a convex surface on the object side and a biconvex lens, and a meniscus convex lens having a convex surface on the object side. The second lens unit L2 corresponds to a sixth surface to a twelfth surface, and includes a meniscus concave lens having a convex surface on the object side, a cemented lens obtained by cementing a biconcave lens and a meniscus convex lens having a convex surface on the object side, and a meniscus concave lens having a convex surface on the image side. Further, the seventh surface has an aspherical shape, and mainly corrects variations in curvature of field and comatic aberration at a peripheral image height accompanying zooming. The third lens unit L3 corresponds to a fourteenth surface to a twenty-second surface, and includes a biconvex lens, a meniscus concave lens having a convex surface on the object side, a biconvex lens, and a cemented lens obtained by cementing a biconvex lens and a meniscus concave lens having a convex surface on the object side. Further, the fourteenth surface and the eighteenth surface each have an aspherical shape, and mainly correct a variation in curvature of field accompanying zooming. The fourth lens unit L4 corresponds to a twenty-third surface to a twenty-fifth surface, and includes a cemented lens obtained by cementing a meniscus convex lens having a convex surface on the image side and a biconcave lens. The twenty-third surface has an aspherical shape, and corrects variations in spherical aberration and curvature of field generated due to focusing. Further, the fourth lens unit L4 is a focusing lens unit configured to move toward the image side during focusing from the infinity side to the proximity side. The fifth lens unit L5 being a part of the rear lens group LR corresponds to a twenty-sixth surface to a twenty-seventh surface, and includes a biconvex lens. The twenty-seventh surface has an aspherical shape, and corrects a variation in curvature of field generated due to zooming. The sixth lens unit L6 being a part of the rear lens group LR corresponds to a twenty-eighth surface to a thirty-second surface, and includes a cemented lens obtained by cementing a biconvex lens and a meniscus concave lens having a convex surface on the image side.

The values of Embodiment 5 corresponding to the respective conditional expressions are shown in Table 1. Embodiment 5 satisfies the expressions (1) to (8), and achieves the zoom lens which is downsized and provided with a high zooming ratio and has high optical performance over the entire zoom range, although being an optical system with a large image size.

Numerical Embodiment 1

| Unit: mm Surface data | | | | |
|---|---|---|---|---|
| Surface number i | ri | di | ndi | vdi |
| 1 | 595.263 | 4.82 | 1.91650 | 31.6 |
| 2 | 125.244 | 15.31 | 1.49700 | 81.5 |
| 3 | −1,226.333 | 0.44 | | |
| 4 | 180.174 | 7.09 | 1.59522 | 67.7 |
| 5 | 618.854 | 0.44 | | |
| 6 | 121.469 | 9.16 | 1.76385 | 48.5 |
| 7 | 723.265 | (Variable) | | |
| 8 | 1,485.495 | 2.92 | 1.85135 | 40.1 |
| 9* | 30.037 | 17.48 | | |
| 10 | −54.315 | 2.04 | 1.76385 | 48.5 |
| 11 | 187.867 | 0.44 | | |
| 12 | 100.672 | 9.90 | 1.85478 | 24.8 |
| 13 | −70.683 | 2.49 | | |
| 14 | −53.640 | 2.04 | 1.59522 | 67.7 |
| 15 | −127.531 | (Variable) | | |
| 16 (Stop) | ∞ | (Variable) | | |
| 17 | 45.212 | 10.85 | 1.85135 | 40.1 |
| 18* | 163.325 | 8.80 | | |
| 19 | 101.147 | 2.58 | 2.00100 | 29.1 |
| 20 | 31.347 | 11.87 | 1.43875 | 94.9 |
| 21 | −76.578 | 2.90 | | |
| 22 | 58.186 | 4.79 | 1.59522 | 67.7 |
| 23 | −862.161 | 1.75 | 2.00100 | 29.1 |
| 24 | 1,165.004 | (Variable) | | |
| 25 | −163.399 | 4.44 | 1.95906 | 17.5 |
| 26 | −50.177 | 1.75 | 1.85135 | 40.1 |
| 27* | 54.010 | (Variable) | | |
| 28 | 184.212 | 13.81 | 1.48749 | 70.2 |
| 29 | −52.149 | 2.19 | 2.00069 | 25.5 |
| 30 | −95.891 | 4.67 | | |
| 31 | 180.884 | 9.19 | 1.48749 | 70.2 |
| 32 | −95.118 | (Variable) | | |
| 33 | ∞ | 3.00 | 1.51633 | 64.1 |
| 34 | ∞ | (Variable) | | |
| Image plane | ∞ | | | |

| Aspherical surface data | | |
|---|---|---|
| Ninth surface | | |
| K = −1.93383e−001 | A4 = −5.59156e−007 | A6 = −4.72447e−010 |
| A8 = 3.31845e−013 | | |
| Eighteenth surface | | |
| K = −1.91478e+001 | A4 = 1.51259e−006 | A6 = −1.49681e−010 |
| A8 = −1.55675e−014 | | |
| Twenty-seventh surface | | |
| K = −1.05264e+000 | A4 = 4.89649e−007 | A6 = −1.18490e−009 |
| A8 = 2.71167e−012 | | |

| Various data Zoom ratio 14.89 | | | |
|---|---|---|---|
| | Wide angle | Intermediate | Telephoto |
| Focal length | 24.35 | 148.31 | 362.58 |
| F-number | 3.50 | 4.97 | 5.60 |
| Half angle of view | 37.66 | 8.29 | 3.41 |

-continued

| | | | |
|---|---|---|---|
| Image height | 18.80 | 21.61 | 21.61 |
| Total lens length | 393.95 | 393.95 | 393.95 |
| BF | 50.02 | 50.02 | 50.02 |
| d7 | 2.81 | 70.60 | 99.66 |
| d15 | 102.36 | 34.57 | 5.51 |
| d16 | 52.42 | 5.99 | 5.70 |
| d24 | 5.73 | 26.93 | 26.72 |
| d27 | 26.47 | 51.71 | 52.20 |
| d32 | 37.15 | 37.15 | 37.15 |
| d34 | 10.88 | 10.88 | 10.88 |

Zoom lens unit data

| Unit | First surface | Focal length |
|---|---|---|
| 1 | 1 | 158.65 |
| 2 | 8 | −31.69 |
| 3 | 16 | ∞ |
| 4 | 17 | 55.36 |
| 5 | 25 | −50.71 |
| 6 | 28 | 93.58 |
| 7 | 33 | ∞ |

Numerical Embodiment 2

Unit: mm
Surface data

| Surface number i | ri | di | ndi | vdi |
|---|---|---|---|---|
| 1 | 231.052 | 4.82 | 1.91650 | 31.6 |
| 2 | 107.148 | 11.40 | 1.49700 | 81.5 |
| 3 | 3,964.230 | 0.44 | | |
| 4 | 106.358 | 8.16 | 1.59522 | 67.7 |
| 5 | 332.956 | 0.44 | | |
| 6 | 172.269 | 4.74 | 1.76385 | 48.5 |
| 7 | 351.010 | (Variable) | | |
| 8 | 743.763 | 2.92 | 1.85135 | 40.1 |
| 9* | 30.819 | 15.14 | | |
| 10 | −68.206 | 2.04 | 1.76385 | 48.5 |
| 11 | 174.625 | 0.44 | | |
| 12 | 86.955 | 9.28 | 1.85478 | 24.8 |
| 13 | −90.104 | 3.34 | | |
| 14 | −57.558 | 2.04 | 1.59522 | 67.7 |
| 15 | −118.238 | (Variable) | | |
| 16 (Stop) | ∞ | (Variable) | | |
| 17* | 30.268 | 9.04 | 1.85135 | 40.1 |
| 18* | 257.283 | 1.41 | | |
| 19 | 68.898 | 2.58 | 2.00100 | 29.1 |
| 20 | 20.436 | 10.01 | 1.43875 | 94.9 |
| 21 | −103.013 | 2.82 | | |
| 22 | 109.505 | 4.22 | 1.59522 | 67.7 |
| 23 | −82.918 | 1.75 | 2.00100 | 29.1 |
| 24 | −117.731 | (Variable) | | |
| 25 | −308.251 | 4.79 | 1.95906 | 17.5 |
| 26 | −36.208 | 1.75 | 1.85135 | 40.1 |
| 27 | 29.840 | (Variable) | | |
| 28 | −85.853 | 10.47 | 1.48749 | 70.2 |
| 29 | −30.172 | 2.19 | 2.00069 | 25.5 |
| 30 | −52.685 | 0.32 | | |
| 31 | 561.918 | 9.64 | 1.48749 | 70.2 |
| 32 | −45.048 | (Variable) | | |
| Image plane | ∞ | | | |

Aspherical surface data

Ninth surface

K = −8.58884e−001  A4 = 2.44009e−006  A6 = 1.36470e−009
A8 = 1.12686e−012

Seventeenth surface

K = −1.01514e−001  A4 = −6.32569e−007  A6 = 5.54329e−010
A8 = −1.93658e−013  A10 = 9.12265e−016  A12 = 7.72177e−019

-continued

Eighteenth surface

K = −9.40298e+001  A4 = 3.26479e−006  A6 = 2.18080e−010
A8 = −3.31254e−012  A10 = 9.74931e−015  A12 = −9.91021e−018

Various data
Zoom ratio 10.00

| | Wide angle | Intermediate | Telephoto |
|---|---|---|---|
| Focal length | 35.04 | 152.85 | 350.37 |
| F-number | 3.50 | 4.97 | 5.60 |
| Half angle of view | 30.36 | 8.05 | 3.53 |
| Image height | 20.53 | 21.61 | 21.61 |
| Total lens length | 321.17 | 321.17 | 321.17 |
| BF | 40.10 | 40.10 | 40.10 |
| d7 | 3.40 | 67.03 | 94.30 |
| d15 | 90.17 | 26.54 | −0.73 |
| d16 | 32.03 | 11.41 | 5.78 |
| d24 | 5.26 | 12.62 | 13.00 |
| d27 | 24.02 | 37.28 | 42.53 |
| d32 | 40.10 | 40.10 | 40.10 |

Zoom lens unit data

| Unit | First surface | Focal length |
|---|---|---|
| 1 | 1 | 166.71 |
| 2 | 8 | −36.72 |
| 3 | 16 | ∞ |
| 4 | 17 | 41.80 |
| 5 | 25 | −34.64 |
| 6 | 28 | 105.34 |

Numerical Embodiment 3

Unit: mm
Surface data

| Surface number i | ri | di | ndi | vdi |
|---|---|---|---|---|
| 1 | 1,329.166 | 4.82 | 1.91650 | 31.6 |
| 2 | 172.812 | 16.30 | 1.49700 | 81.5 |
| 3 | −1,244.760 | 0.44 | | |
| 4 | 225.197 | 9.86 | 1.59522 | 67.7 |
| 5 | 1,646.977 | 0.44 | | |
| 6 | 148.892 | 11.14 | 1.76385 | 48.5 |
| 7 | 607.316 | (Variable) | | |
| 8 | 490.884 | 2.92 | 1.85135 | 40.1 |
| 9* | 32.951 | 20.49 | | |
| 10 | −49.475 | 2.04 | 1.49700 | 81.5 |
| 11 | 235.305 | 0.44 | | |
| 12 | 110.810 | 6.72 | 1.92286 | 18.9 |
| 13 | −1,012.565 | (Variable) | | |
| 14 (Stop) | ∞ | (Variable) | | |
| 15 | 56.280 | 7.81 | 1.85135 | 40.1 |
| 16* | 1,120.278 | 8.73 | | |
| 17 | 109.248 | 2.19 | 2.00100 | 29.1 |
| 18 | 46.347 | 6.96 | 1.43875 | 94.9 |
| 19 | −115.679 | 3.31 | | |
| 20 | 51.948 | 2.19 | 2.00100 | 29.1 |
| 21 | 29.396 | 7.59 | 1.61800 | 63.3 |
| 22 | −116.456 | (Variable) | | |
| 23 | −179.212 | 3.92 | 1.95906 | 17.5 |
| 24 | −46.821 | 1.75 | 1.85135 | 40.1 |
| 25* | 29.170 | (Variable) | | |
| 26 | 76.784 | 16.76 | 1.59522 | 67.7 |
| 27 | −64.198 | 2.34 | 1.85478 | 24.8 |
| 28 | −318.277 | 7.42 | | |
| 29 | 169.309 | 12.20 | 1.76802 | 49.2 |
| 30 | −119.996 | (Variable) | | |
| Image plane | ∞ | | | |

-continued

Aspherical surface data

Ninth surface

K = −6.12019e−002   A4 = −8.16875e−007   A6 = −2.92061e−010
A8 = −2.34699e−013

Sixteenth surface

K = −8.84476e+002   A4 = 1.65051e−006   A6 = −1.93458e−010

Twenty-fifth surface

K = −1.11873e+000   A4 = 2.86232e−006   A6 = −3.33756e−009
A8 = 1.54669e−011

Various data
Zoom ratio 11.68

|  | Wide angle | Intermediate | Telephoto |
|---|---|---|---|
| Focal length | 25.20 | 125.05 | 294.41 |
| F-number | 3.50 | 4.97 | 5.60 |
| Half angle of view | 36.72 | 9.80 | 4.20 |
| Image height | 18.80 | 21.61 | 21.61 |
| Total lens length | 374.08 | 374.08 | 374.08 |
| BF | 21.75 | 21.75 | 21.75 |
| d7 | 2.31 | 84.23 | 119.34 |
| d13 | 119.77 | 37.85 | 2.74 |
| d14 | 33.03 | 5.78 | 5.71 |
| d22 | 7.71 | 18.47 | 24.15 |
| d25 | 30.73 | 47.22 | 41.61 |
| d30 | 21.75 | 21.75 | 21.75 |

Zoom lens unit data

| Unit | First surface | Focal length |
|---|---|---|
| 1 | 1 | 201.88 |
| 2 | 8 | −36.06 |
| 3 | 14 | ∞ |
| 4 | 15 | 44.20 |
| 5 | 23 | −30.67 |
| 6 | 26 | 64.54 |

Numerical Embodiment 4

Unit: mm
Surface data

| Surface number i | ri | di | ndi | vdi |
|---|---|---|---|---|
| 1 | 412.009 | 4.82 | 1.91650 | 31.6 |
| 2 | 117.727 | 10.99 | 1.49700 | 81.5 |
| 3 | −688.668 | 0.44 | | |
| 4 | 112.204 | 8.60 | 1.59522 | 67.7 |
| 5 | 667.485 | 0.44 | | |
| 6 | 135.895 | 5.58 | 1.76385 | 48.5 |
| 7 | 326.364 | (Variable) | | |
| 8 | 540.520 | 2.92 | 1.85135 | 40.1 |
| 9* | 30.357 | 13.62 | | |
| 10 | −64.627 | 2.04 | 1.76385 | 48.5 |
| 11 | 190.720 | 0.44 | | |
| 12 | 78.105 | 8.62 | 1.85478 | 24.8 |
| 13 | −76.743 | 2.91 | | |
| 14 | −51.550 | 2.04 | 1.59522 | 67.7 |
| 15 | −553.795 | (Variable) | | |
| 16 (Stop) | ∞ | (Variable) | | |
| 17 | 44.922 | 10.67 | 1.85135 | 40.1 |
| 18* | 204.432 | 9.08 | | |
| 19 | 123.857 | 2.58 | 2.00100 | 29.1 |
| 20 | 30.821 | 15.23 | 1.43875 | 94.9 |
| 21 | −70.497 | 2.90 | | |
| 22 | 50.686 | 7.32 | 1.59522 | 67.7 |
| 23 | 201.811 | (Variable) | | |
| 24 | −215.353 | 9.78 | 1.95906 | 17.5 |
| 25 | −52.601 | 1.75 | 1.85135 | 40.1 |
| 26* | 53.467 | (Variable) | | |
| 27 | 106.991 | 10.96 | 1.48749 | 70.2 |
| 28 | −55.118 | 2.19 | 2.00069 | 25.5 |
| 29 | −104.815 | 0.41 | | |
| 30 | 1,397.473 | 6.22 | 1.48749 | 70.2 |
| 31 | −107.531 | (Variable) | | |
| 32 | ∞ | 3.00 | 1.51633 | 64.1 |
| 33 | ∞ | (Variable) | | |
| Image plane | ∞ | | | |

Aspherical surface data

Ninth surface

K = −4.14166e−001   A4 = 9.18857e−007   A6 = 7.99269e−010
A8 = 1.36470e−012

Eighteenth surface

K = −4.80752e+001   A4 = 1.62739e−006   A6 = −4.13204e−010
A8 = 1.80517e−013

Twenty-sixth surface

K = −1.04447e+000   A4 = 6.18937e−007   A6 = −1.35490e−009
A8 = 3.04616e−012

Various data
Zoom ratio 11.00

|  | Wide angle | Intermediate | Telephoto |
|---|---|---|---|
| Focal length | 35.13 | 160.38 | 386.45 |
| F-number | 4.50 | 5.27 | 5.60 |
| Half angle of view | 30.30 | 7.67 | 3.20 |
| Image height | 20.53 | 21.61 | 21.61 |
| Total lens length | 362.82 | 362.82 | 362.82 |
| BF | 54.68 | 54.68 | 54.68 |
| d7 | 3.25 | 58.61 | 82.34 |
| d15 | 84.62 | 29.26 | 5.54 |
| d16 | 37.93 | 13.09 | 5.99 |
| d23 | 5.74 | 24.34 | 19.94 |
| d26 | 34.05 | 40.28 | 51.78 |
| d31 | 25.75 | 25.75 | 25.75 |
| d33 | 26.95 | 26.95 | 26.95 |

Zoom lens unit data

| Unit | First surface | Focal length |
|---|---|---|
| 1 | 1 | 140.15 |
| 2 | 8 | −31.44 |
| 3 | 16 | ∞ |
| 4 | 17 | 56.66 |
| 5 | 24 | −53.55 |
| 6 | 27 | 105.64 |
| 7 | 32 | ∞ |

Numerical Embodiment 5

Unit: mm
Surface data

| Surface number i | ri | di | ndi | vdi |
|---|---|---|---|---|
| 1 | 305.835 | 4.38 | 1.91650 | 31.6 |
| 2 | 136.484 | 21.60 | 1.59522 | 67.7 |
| 3 | −5,171.068 | 0.46 | | |
| 4 | 134.374 | 15.89 | 1.59522 | 67.7 |
| 5 | 1,128.496 | (Variable) | | |
| 6 | 145.464 | 2.92 | 1.85135 | 40.1 |
| 7* | 46.127 | 14.44 | | |
| 8 | −88.153 | 2.19 | 1.59522 | 67.7 |
| 9 | 58.535 | 7.87 | 1.95906 | 17.5 |
| 10 | 173.425 | 7.76 | | |

-continued

| | | | | |
|---|---|---|---|---|
| 11 | −54.885 | 2.04 | 1.69680 | 55.5 |
| 12 | −111.212 | (Variable) | | |
| 13 (Stop) | ∞ | (Variable) | | |
| 14* | 54.374 | 13.70 | 1.59349 | 67.0 |
| 15 | −272.852 | 14.78 | | |
| 16 | 271.591 | 2.92 | 1.73800 | 32.3 |
| 17 | 48.383 | 3.21 | | |
| 18* | 48.139 | 11.10 | 1.59349 | 67.0 |
| 19 | −221.253 | 2.10 | | |
| 20 | 98.862 | 10.46 | 1.49700 | 81.5 |
| 21 | −49.268 | 2.75 | 1.65412 | 39.7 |
| 22 | −106.474 | (Variable) | | |
| 23* | −818.992 | 6.42 | 1.95906 | 17.5 |
| 24 | −87.882 | 2.04 | 1.88300 | 40.8 |
| 25 | 37.127 | (Variable) | | |
| 26 | 131.936 | 8.84 | 1.59522 | 67.7 |
| 27* | −257.265 | (Variable) | | |
| 28 | 111.434 | 10.75 | 1.59522 | 67.7 |
| 29 | −103.993 | 2.17 | 1.85478 | 24.8 |
| 30 | −177.790 | (Variable) | | |
| Image plane | ∞ | | | |

Aspherical surface data

Seventh surface $K = -5.13265e-001$  $A4 = 8.70559e-007$  $A6 = 2.82689e-010$
$A8 = 5.01107e-013$ Fourteenth surface $K = -6.85397e-001$  $A4 = -2.98975e-009$  $A6 = -1.62801e-010$
$A8 = 3.65985e-014$ Eighteenth surface $K = 7.55655e-001$  $A4 = -2.59343e-006$  $A6 = -3.34100e-010$
$A8 = -5.60596e-013$ Twenty-third surface $K = 1.34806e+002$  $A4 = 4.96620e-007$  $A6 = -3.04205e-010$
$A8 = 3.60323e-013$ Twenty-seventh surface $K = 6.80445e+000$  $A4 = -3.77298e-007$  $A6 = -2.69160e-010$
$A8 = 8.55024e-014$ Various data
Zoom ratio 11.98

| | Wide angle | Intermediate | Telephoto |
|---|---|---|---|
| Focal length | 29.22 | 203.97 | 350.06 |
| F-number | 2.80 | 4.36 | 4.50 |
| Half angle of view | 32.15 | 6.05 | 3.53 |
| Image height | 18.36 | 21.61 | 21.61 |
| Total lens length | 406.68 | 406.68 | 406.68 |
| BF | 22.42 | 22.42 | 22.42 |
| d5 | 2.64 | 98.22 | 115.75 |
| d12 | 117.77 | 22.20 | 4.67 |
| d13 | 40.76 | 11.52 | 5.51 |
| d22 | 4.10 | 27.29 | 35.34 |
| d25 | 39.35 | 52.78 | 45.61 |
| d27 | 8.85 | 1.46 | 6.59 |
| d30 | 22.42 | 22.42 | 22.42 |

Zoom lens unit data

| Unit | First surface | Focal length |
|---|---|---|
| 1 | 1 | 215.60 |
| 2 | 6 | −35.04 |
| 3 | 13 | ∞ |
| 4 | 14 | 55.03 |
| 5 | 23 | −41.35 |
| 6 | 26 | 147.77 |
| 7 | 28 | 132.39 |

TABLE 1

Values of Embodiments corresponding to respective conditional expressions

| | | Embodiment | | | | |
|---|---|---|---|---|---|---|
| Conditional Expression | | 1 | 2 | 3 | 4 | 5 |
| (1) | f4/fR | −0.54 | −0.33 | −0.48 | −0.51 | −0.56 |
| (2) | M2/M3 | −2.07 | −3.46 | −4.28 | −2.48 | −3.21 |
| (3) | dskt/(fw × tanωw) | −0.21 | −0.39 | −0.31 | −0.19 | −0.22 |
| (4) | f1/fw | 6.51 | 4.76 | 8.01 | 3.99 | 7.38 |
| (5) | f1/f2 | −5.01 | −4.54 | −5.60 | −4.46 | −6.15 |
| (6) | f1/f4 | −3.13 | −4.81 | −6.58 | −2.62 | −5.21 |
| (7) | Nd1pr/Nd1pf | 1.14 | 1.14 | 1.14 | 1.14 | 1.00 |
| (8) | fw × tanωw | 18.80 | 20.53 | 18.79 | 20.52 | 18.37 |
| | f1 | 158.65 | 166.71 | 201.88 | 140.15 | 215.60 |
| | f2 | −31.69 | −36.72 | −36.06 | −31.44 | −35.04 |
| | f3 | 55.36 | 41.80 | 44.20 | 56.66 | 55.03 |
| | f4 | −50.71 | −34.64 | −30.67 | −53.55 | −41.35 |
| | fR | 93.58 | 105.34 | 64.54 | 105.64 | 73.25 |
| | fw | 24.35 | 35.04 | 25.20 | 35.13 | 29.22 |
| | ωw | 37.67 | 30.36 | 36.72 | 30.30 | 32.15 |
| | M2 | 96.85 | 90.90 | 117.03 | 79.09 | 113.11 |
| | M3 | −46.72 | −26.25 | −27.32 | −31.93 | −35.25 |
| | dskt | −4.03 | −7.99 | −5.83 | −3.99 | −4.00 |
| | Nd1pr | 1.54611 | 1.54611 | 1.54611 | 1.54611 | 1.59522 |
| | Nd1pf | 1.76385 | 1.76385 | 1.76385 | 1.76385 | 1.59522 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-077997, filed Apr. 11, 2017, which is hereby incorporated by reference herein in its entirety.

What is claimed is:

1. A zoom lens comprising in order from an object side to an image side:
   a first lens unit having a positive refractive power and configured not to move for zooming;
   a second lens unit having a negative refractive power and configured to move for zooming;
   a third lens unit having a positive refractive power and configured to move for zooming;
   a fourth lens unit having a negative refractive power and configured to move for zooming; and
   a rear lens unit having a positive refractive power and including at least one lens unit,
   wherein the fourth lens unit is configured to move for focusing, and
   wherein conditional expressions $-0.60 < f4/fR < -0.20;$ $-5.00 < M2/M3 < -1.50;$ and $-0.42 < dskt/(fw \times \tan \omega w) < -0.15$ are satisfied, where f4 represents a focal length of the fourth lens unit, fR represents a focal length of the rear lens unit at a telephoto end, fw represents a focal length of the zoom lens at a wide angle end, M2 represents an amount of movement of the second lens unit from the wide angle end to the telephoto end, M3 represents an amount of movement of the third lens unit from the wide angle end to the telephoto end, ωw represents a half angle of view at the wide angle end, "dskt" (mm) represents an amount of displacement of a focus position in a case where the fourth lens unit moves toward the image side by 1 (mm) in a state in which the focus position is at infinity at the telephoto end, and a sign of an amount of movement of a lens unit is negative in a case where the lens unit moves toward the object side, and the sign is positive in a case where the lens unit moves toward the image side with respect to zooming from the wide angle end to the telephoto end.

2. A zoom lens according to claim 1, wherein a conditional expression $3.5 < f1/fw < 8.5$ is satisfied, where f1 represents a focal length of the first lens unit.

3. A zoom lens according to claim 1, wherein a conditional expression $-6.5 < f1/f2 < -4.0$ is satisfied, where f1 represents a focal length of the first lens unit, and f2 represents a focal length of the second lens unit.

4. A zoom lens according to claim 1, wherein a conditional expression $-7.0 < f1/f4 < -2.0$ is satisfied, where f1 represents a focal length of the first lens unit, and f4 represents a focal length of the fourth lens unit.

5. A zoom lens according to claim 1, further comprising an aperture stop arranged between the second lens unit and the third lens unit.

6. A zoom lens according to claim 5, wherein the aperture stop is configured not to move in an optical axis direction thereof for zooming.

7. A zoom lens according to claim 1, wherein the first lens unit includes at least three lenses.

8. A zoom lens according to claim 1, wherein a conditional expression $0.99 < Nd1pr/Nd1pf < 1.40$ is satisfied, where Nd1pr represents a refractive index of a positive lens G1pr arranged closest to the image side in the first lens unit, and Nd1pf represents an average of refractive indices of positive lenses other than the positive lens G1pr in the first lens unit.

9. A zoom lens according to claim 1, wherein a conditional expression $14.0 < fw \times \tan \omega w$ is satisfied.

10. An image pickup apparatus, comprising:
    a zoom lens comprising in order from an object side to an image side:
    a first lens unit having a positive refractive power and configured not to move for zooming;
    a second lens unit having a negative refractive power and configured to move for zooming;
    a third lens unit having a positive refractive power and configured to move for zooming;
    a fourth lens unit having a negative refractive power and configured to move for zooming; and
    a rear lens unit having a positive refractive power and including at least one lens unit,
    wherein the fourth lens unit is configured to move for focusing, and
    wherein conditional expressions $-0.60 < f4/fR < -0.20;$ $-5.00 < M2/M3 < -1.50;$ and $-0.42 < dskt/(fw \times \tan \omega w) < -0.15$ are satisfied, where f4 represents a focal length of the fourth lens unit, fR represents a focal length of the rear lens unit at a telephoto end, fw represents a focal length of the zoom lens at a wide angle end, M2 represents an amount of movement of the second lens unit from the wide angle end to the telephoto end, M3 represents an amount of movement of the third lens unit from the wide angle end to the telephoto end, ωw represents a half angle of view at the wide angle end, "dskt" (mm) represents an amount of displacement of a focus position in a case where the fourth lens unit moves toward the image side by 1 (mm) in a state in which the focus position is at infinity at the telephoto end, and a sign of an amount of movement of a lens unit is negative in a case where the lens unit moves toward the object side, and the sign is positive in a case where the lens unit moves toward the image side with respect to zooming from the wide angle end to the telephoto end; and
    an image pickup element arranged on an image plane of the zoom lens.

* * * * *